US011846783B2

(12) United States Patent
Tokutake

(10) Patent No.: US 11,846,783 B2
(45) Date of Patent: Dec. 19, 2023

(54) INFORMATION PROCESSING APPARATUS, INFORMATION PROCESSING METHOD, AND PROGRAM

(71) Applicant: Sony Group Corporation, Tokyo (JP)

(72) Inventor: Kenji Tokutake, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 189 days.

(21) Appl. No.: 17/600,606

(22) PCT Filed: May 17, 2019

(86) PCT No.: PCT/JP2019/019776
§ 371 (c)(1),
(2) Date: Oct. 1, 2021

(87) PCT Pub. No.: WO2020/234939
PCT Pub. Date: Nov. 26, 2020

(65) Prior Publication Data
US 2022/0171202 A1 Jun. 2, 2022

(51) Int. Cl.
G02B 27/01 (2006.01)
G02B 27/00 (2006.01)
G06F 3/01 (2006.01)

(52) U.S. Cl.
CPC ..... G02B 27/0179 (2013.01); G02B 27/0093 (2013.01); G02B 27/017 (2013.01);
(Continued)

(58) Field of Classification Search
CPC ............ G02B 27/0179; G02B 27/0093; G02B 27/017; G02B 2027/0123;
(Continued)

(56) References Cited

U.S. PATENT DOCUMENTS

2002/0044152 A1* 4/2002 Abbott, III ........... G02B 27/017
345/629
2011/0213664 A1* 9/2011 Osterhout ............... G06F 3/013
705/14.58
(Continued)

FOREIGN PATENT DOCUMENTS

CA 2943446 A1 10/2015
CN 106030692 A 10/2016
(Continued)

OTHER PUBLICATIONS

International Search Report and Written Opinion dated Aug. 6, 2019, received for PCT Application PCT/JP2019/019776, filed on May 17, 2019, 10 pages including English Translation.

*Primary Examiner* — Dmitriy Bolotin
(74) *Attorney, Agent, or Firm* — XSENSUS LLP

(57) ABSTRACT

To view AR content fused with a real space more safely. There is provided an information processing apparatus including a control unit that controls display of AR content by a display device arranged in front of eyes of a user, in which the control unit controls a manner of displaying the AR content so that a degree of decrease in user's viewing level of a real space is reduced as compared with a case where original content is displayed. Furthermore, provided is an information processing method including controlling, by a processor, display of AR content by a display device arranged in front of eyes of a user, in which the controlling further includes controlling a manner of displaying the AR content so that a degree of decrease in user's viewing level of a real space is reduced as compared with a case where original content is displayed.

17 Claims, 20 Drawing Sheets

(52) U.S. Cl.
CPC ........ *G06F 3/017* (2013.01); *G02B 2027/014* (2013.01); *G02B 2027/0123* (2013.01); *G02B 2027/0138* (2013.01)

(58) Field of Classification Search
CPC ...... G02B 2027/0138; G02B 2027/014; G06F 3/017; G06T 19/006; G09G 2340/0464; G09G 2340/125; G09G 2354/00; G09G 5/38; G09G 3/001
See application file for complete search history.

(56) References Cited

U.S. PATENT DOCUMENTS

| | | | | |
|---|---|---|---|---|
| 2012/0086727 | A1* | 4/2012 | Korah | G06F 3/03 345/633 |
| 2015/0277119 | A1* | 10/2015 | Wong | G06F 3/013 345/633 |
| 2015/0302867 | A1* | 10/2015 | Tomlin | G10L 25/78 704/270 |
| 2016/0026253 | A1* | 1/2016 | Bradski | H04N 13/128 345/8 |
| 2016/0306173 | A1 | 10/2016 | Tsukahara et al. | |
| 2018/0150186 | A1 | 5/2018 | Norieda et al. | |
| 2018/0336591 | A1* | 11/2018 | Neumeier | G06Q 30/0261 |
| 2018/0349946 | A1* | 12/2018 | Nguyen | G06Q 30/0244 |

FOREIGN PATENT DOCUMENTS

| | | |
|---|---|---|
| CN | 106233384 A | 12/2016 |
| CN | 107615214 A | 1/2018 |
| EP | 3109854 A1 | 12/2016 |
| JP | 2011-2753 A | 1/2011 |
| JP | 2015-37242 A | 2/2015 |
| JP | 2015-166816 A | 9/2015 |
| JP | 2017-516196 A | 6/2017 |
| JP | 2017-181842 A | 10/2017 |
| KR | 20160145719 A | 12/2016 |
| WO | 2015/125626 A1 | 8/2015 |
| WO | 2015/160561 A1 | 10/2015 |
| WO | 2016/185845 A1 | 11/2016 |
| WO | 2018/198499 A1 | 11/2018 |

\* cited by examiner

ND PROGRAM

INFORMATION PROCESSING APPARATUS, INFORMATION PROCESSING METHOD, AND PROGRAM

CROSS-REFERENCE TO RELATED APPLICATION

The present application is based on PCT filing PCT/JP2019/019776, filed May 17, 2019, the entire contents of which are incorporated herein by reference.

FIELD

The present disclosure relates to an information processing apparatus, an information processing method, and a program.

BACKGROUND

In recent years, services utilizing augmented reality (AR) technology and devices for realizing the services have been developed. For example, Patent Literature 1 discloses a head mounted display for realizing AR technology.

CITATION LIST

Patent Literature

Patent Literature 1: JP 2011-2753 A

SUMMARY

Technical Problem

By the way, in a case where a user wearing a head mounted display such as the one disclosed in Patent Literature 1 views AR content while performing an action such as walking, there is a possibility that a viewing level of an object or the like existing in the real space is lowered by the displayed AR content.

Solution to Problem

According to the present disclosure, an information processing apparatus is provided that includes: a control unit that controls display of AR content by a display device arranged in front of eyes of a user, wherein the control unit controls a manner of displaying the AR content so that a degree of decrease in a user's viewing level of a real space is reduced as compared with a case where original content is displayed.

Moreover, according to the present disclosure, an information processing method is provided that includes controlling, by a processor, display of AR content by a display device arranged in front of eyes of a user, wherein the controlling further includes controlling a manner of displaying the AR content so that a degree of decrease in user's viewing level of a real space is reduced as compared with a case where original content is displayed.

Moreover, according to the present disclosure, a program is provided that causes a computer to function as an information processing apparatus including a control unit that controls display of AR content by a display device arranged in front of eyes of a user, wherein the control unit controls a manner of displaying the AR content so that a degree of decrease in user's viewing level of a real space is reduced as compared with a case where original content is displayed.

DESCRIPTION OF EMBODIMENTS

Hereinafter, preferred embodiments of the present disclosure will be described in detail with reference to the accompanying drawings. In the present specification and the drawings, constituent elements having substantially identical functional configurations are given identical reference signs, and repeated description thereof is omitted.

The description will be given in the following order.
1. Embodiment
1.1. Overview
1.2. System configuration example
1.3. Functional configuration example
1.4. Detailed configuration example
1.5. Display control of AR content
2. Summary

1. Embodiment

1.1. Overview

First, an outline of an embodiment of the present disclosure will be described. As described above, in recent years, many services utilizing AR technology and devices for realizing the services have been developed. Examples of the devices include a head mounted display such as the one disclosed in Patent Literature 1.

A user can view AR content displayed on a display while visually recognizing the real space by using a see-through (including video see-through and optical see-through) head mounted display such as the one disclosed in Patent Literature 1.

However, for example, in a case where a user views AR content while moving, for example, while walking, there is a possibility that a viewing level of an object or the like existing in the real space decreases due to the displayed AR content.

Figure 1:
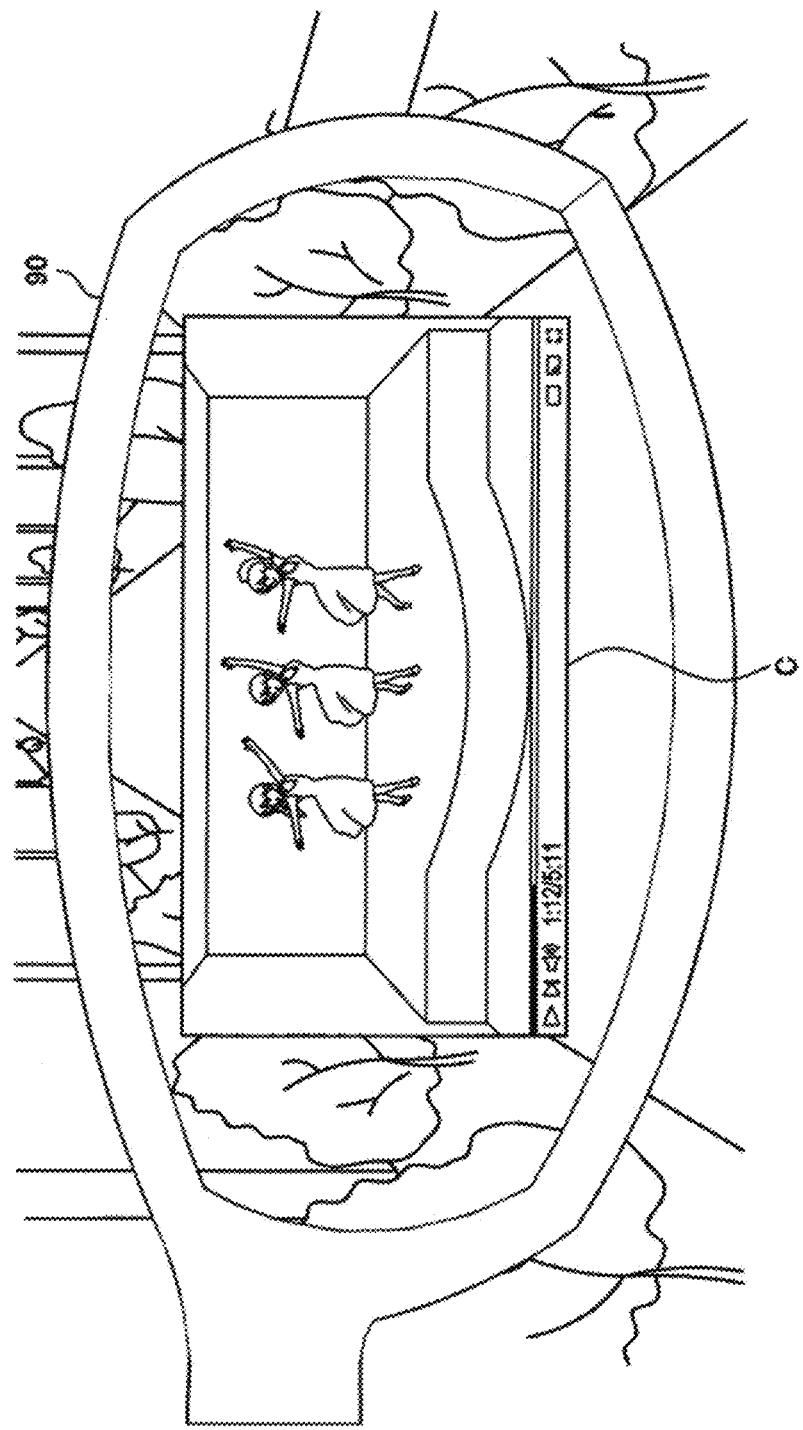
FIG. 1 is a diagram for explaining display of AR content by a general head mounted display.

FIG. 1 is a diagram for explaining display of AR content by a general head mounted display. FIG. 1 illustrates an example of a field of view of a user wearing a general head mounted display 90. Note that, in the example illustrated in FIG. 1, a user views video content provided by a video streaming service as AR content C by using the head mounted display 90.

As in the example illustrated in FIG. 1, in a case where the head mounted display 90 displays the AR content C in a central portion of the field of view of the user, most of the field of view of the user is occupied by the AR content C, and therefore a user's viewing level of the real space (that is, an object, scenery, or the like that can be visually recognized through a see-through display) significantly decreases.

In a case where the user is performing an action such as walking or driving a vehicle, the user is hindered by the displayed AR content C and cannot visually recognize an object, terrain, or the like existing in a moving direction and may, for example, collide with something or falls over.

The technical idea according to the present disclosure has been conceived focusing on the above points and enables more secure viewing of AR content fused with a real space. For this purpose, an information processing apparatus according to an embodiment of the present disclosure includes a control unit that controls display of AR content by a display device arranged in front of eyes of a user. Furthermore, one of features of the control unit according to an embodiment of the present disclosure is to control a manner of displaying the AR content so that a degree of decrease in the user's viewing level of the real space is reduced as compared with a case where original content is displayed.

Figure 2:
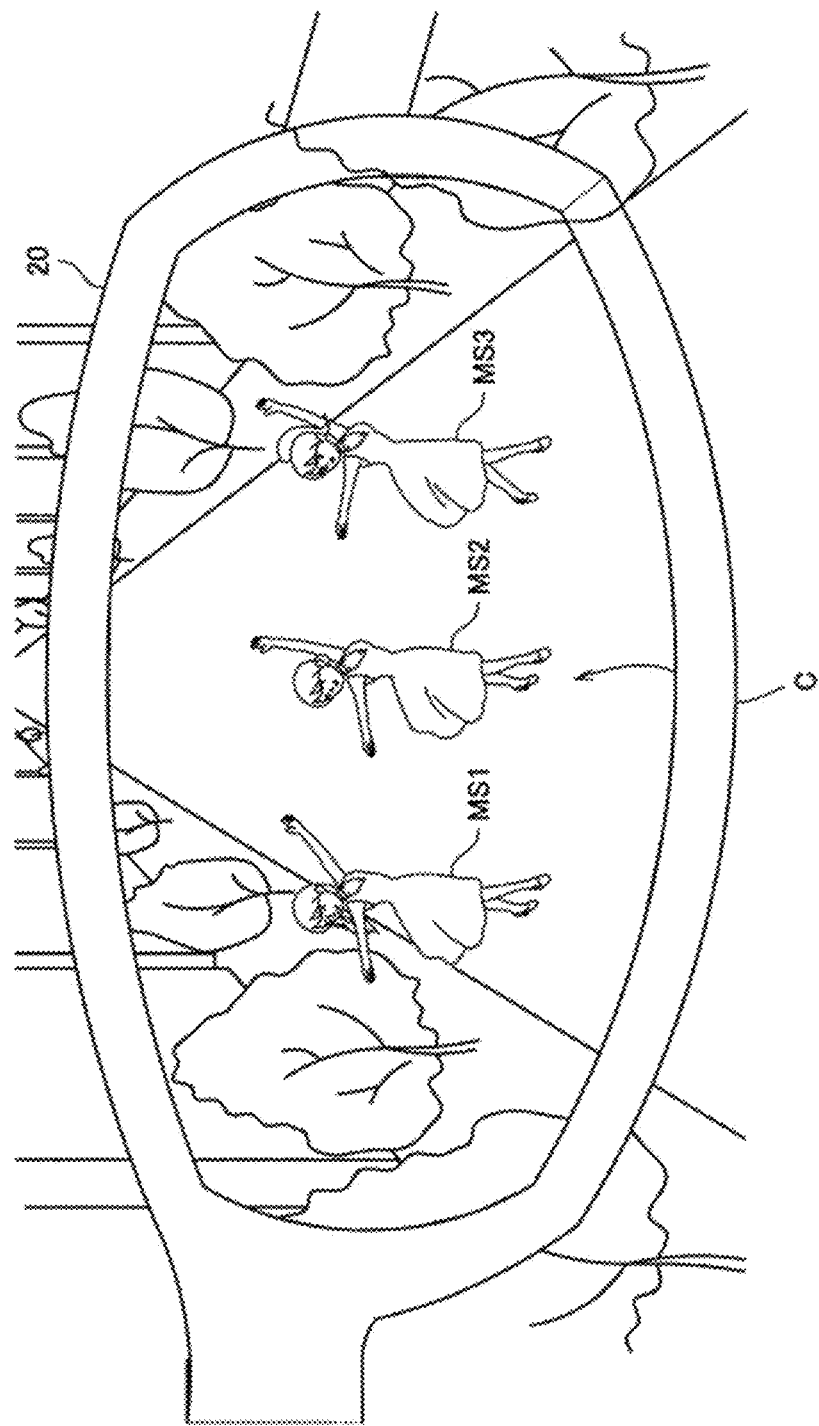
FIG. 2 is a diagram illustrating an example of AR content display according to an embodiment of the present disclosure.

FIG. 2 is a diagram illustrating an example of displayed AR content according to the present embodiment. FIG. 2 illustrates an example of a field of view of a user wearing a head mounted display 20 according to the present embodiment. Note that the head mounted display is an example of an information processing apparatus according to the present disclosure.

In FIG. 2, the user is viewing video content provided by a video streaming service as AR content as in FIG. 1. Meanwhile, in the example illustrated in FIG. 2, the head mounted display 20 according to the present embodiment displays the AR content C in which background excluding main subjects MS1 to MS3 corresponding to three persons has been removed from the video content (referred to as original content).

According to the above control, it is possible to reduce a region in which the AR content C is superimposed on the real space, and therefore a degree of decrease in the user's viewing level of the real space can be effectively kept small.

A main subject according to the present embodiment may be, for example, a subject that the user is assumed to pay more attention to in original content such as video content. For example, in a case where the original content is a music promotion video, a drama, a movie, or the like, the main subject according to the present embodiment may be a person (performer) as illustrated in FIG. 2.

As described above, according to the information processing method according to the present embodiment, it is possible to extract, from original content, a region corresponding to a subject that a user is assumed to pay more attention to, that is, a subject that the user is assumed to be more interested in viewing, and to display the region as AR content.

This makes it possible to reduce a region in which AR content is superimposed on the real space, thereby improving safety and providing high-quality AR experience since content that keeps a user's interest can be displayed.

Note that the display control illustrated in FIG. 2 is merely an example, and the display control of AR content according to the present embodiment is not limited to such an example. Specific examples of the display control according to the present embodiment and a configuration for realizing the various types of display control will be described in detail below.

1.2. System Configuration Example

Figure 3:
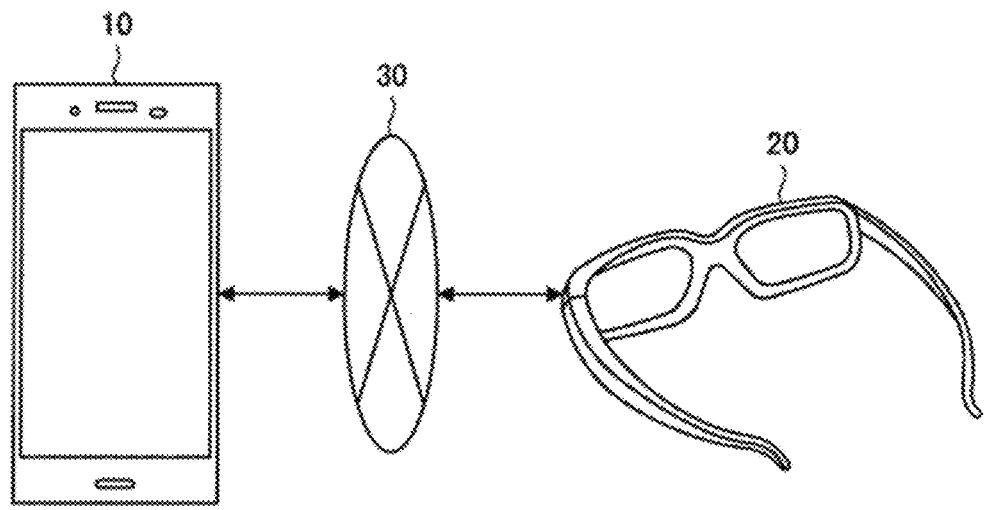
FIG. 3 is a diagram illustrating a configuration example of an information processing system according to the embodiment.

First, a configuration example of an information processing system according to the present embodiment will be described. FIG. 3 is a diagram illustrating a configuration example of the information processing system according to the present embodiment. As illustrated in FIG. 3, the information processing system according to the present embodiment includes an information processing terminal 10 and the head mounted display 20. Furthermore, the information processing terminal 10 and the head mounted display 20 are connected so as to be communicable with each other over a network 30.

(Information Processing Terminal 10)

The information processing terminal 10 is an example of an information processing apparatus that realizes the information processing method according to the present embodiment. The information processing terminal 10 according to the present embodiment controls the AR display by the head mounted display 20 via the network 30. The information processing terminal 10 according to the present embodiment may be, for example, a small electronic device that is easy to carry around, such as a smartphone. Alternatively, the information processing terminal 10 according to the present embodiment may be a server.

(Head Mounted Display 20)

The head mounted display 20 according to the present embodiment is a device that includes a see-through display and enables a user to visually recognize a real space and view AR content. The head mounted display 20 according to the present embodiment may display AR content, for example, on the basis of control by the information processing terminal 10.

The head mounted display 20 according to the present embodiment may be, for example, an eyeglass-type or preventative device. Alternatively, the head mounted display 20 may be, for example, an external device that can be mounted on normal glasses or the like.

(Network 30)

The network 30 has a function of connecting the information processing terminal 10 and the head mounted display 20. The network 30 may include a wireless communication network such as Wi-Fi (registered trademark) or Bluetooth (registered trademark). Furthermore, the network 30 may include a mobile communication network such as long term evolution (LTE).

The configuration example of the information processing system according to the present embodiment has been described above. Note that the configuration described above with reference to FIG. 3 is merely an example, and the configuration of the information processing system according to the present embodiment is not limited to such an example. For example, the case where the information processing terminal 10 controls display of AR content by the head mounted display 20 over the network 30 has been described above as an example. On the other hand, control by the information processing terminal 10 is not necessarily required, and the head mounted display 20 according to the present embodiment may independently realize the information processing method according to the present embodiment.

1.3. Functional Configuration Example

Figure 4:
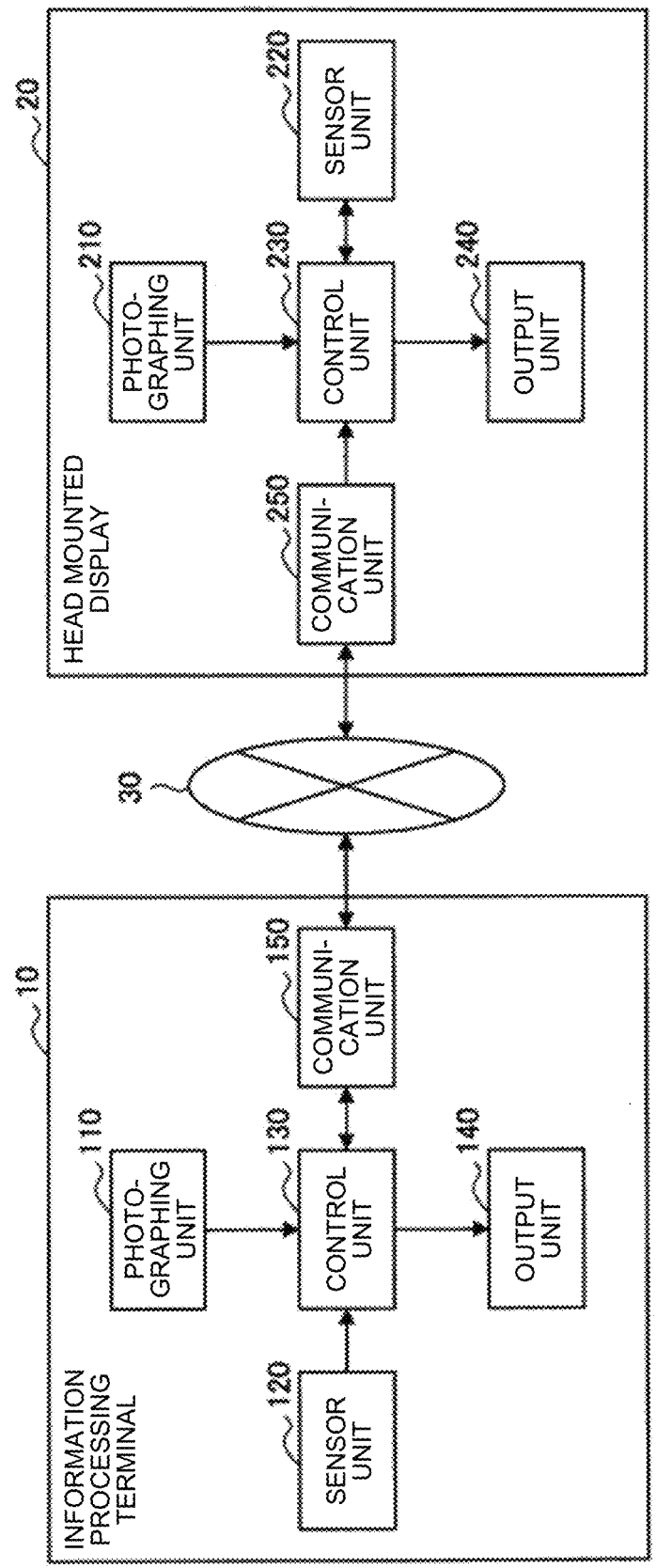
FIG. 4 is a block diagram illustrating functional configuration examples of an information processing terminal 10 and a head mounted display 20 according to the embodiment.

Next, functional configuration examples of the information processing terminal 10 and the head mounted display 20 according to the present embodiment will be described. FIG. 4 is a block diagram illustrating functional configuration examples of the information processing terminal 10 and the head mounted display 20 according to the present embodiment. Note that, in the following, a case where the information processing terminal 10 controls AR display by the head mounted display 20 will be described as a main example.

(Information Processing Terminal 10)

((Photographing Unit 110))

A photographing unit 110 according to the present embodiment has a function of photographing a real space. For example, in a case where the head mounted display 20 does not have a photographing function, a control unit 130, which will be described later, may control AR display by the head mounted display 20 on the basis of image information of the real space photographed by the photographing unit 110. In this case, the photographing unit 110 is arranged so as to be capable of photographing the same direction as the direction in which the user visually recognizes the real space through the head mounted display 20.

((Sensor Unit 120))

A sensor unit 120 according to the present embodiment has a function of collecting various kinds of sensor information such as acceleration and angular velocity. For example, in a case where the head mounted display 20 does not have a function of collecting sensor information such as the ones described above, the control unit 130, which will be described later, may control AR display by the head mounted display 20 on the basis of the sensor information collected by the sensor unit 120.

((Control Unit 130))

The control unit 130 according to the present embodiment collectively controls constituent elements included in the information processing terminal 10. Furthermore, the control unit 130 according to the present embodiment has a function of controlling AR display by the head mounted display 20 on the basis of photographed image information and collected sensor information. One of features of the control unit 130 according to the present embodiment is to control a manner in which AR content is displayed by an output unit 240 so that a degree of decrease in user's viewing level of the real space is reduced as compared with a case where original content is displayed by the output unit 240 of the head mounted display 20.

For example, as illustrated in FIG. 2, the control unit 130 according to the present embodiment may cause the output unit 240 to display AR content obtained by removing background excluding a main subject from original content.

Note that the above manner of displaying may include display content, a display position, a display timing, and the like of the AR content. Details of the functions of the control unit 130 according to the present embodiment will be described later.

((Output Unit 140))

The output unit 140 according to the present embodiment outputs various kinds of information on the basis of control of the control unit 130. For this purpose, the output unit 140 according to the present embodiment includes a display device, a speaker, or the like.

((Communication Unit 150))

A communication unit 150 according to the present embodiment performs information communication with the head mounted display 20 over the network 30.

((Head Mounted Display 20))

((Photographing Unit 210))

A photographing unit 210 according to the present embodiment has a function of photographing a real space. The photographing unit 210 according to the present embodiment is arranged so as to be capable of photographing the same direction as the direction in which the user visually recognizes the real space through an output unit 240, which will be described later.

((Sensor Unit 220))

A sensor unit 220 according to the present embodiment has a function of collecting various kinds of sensor information such as acceleration and angular velocity.

((Control Unit 230))

A control unit 230 according to the present embodiment collectively controls constituent elements included in the head mounted display 20. Furthermore, the control unit 230 performs processing related to display of AR content on the basis of control of the information processing terminal 10. For example, the control unit 230 may deliver image information, a control signal, and the like related to AR content generated by the control unit 130 of the information processing terminal 10 to the output unit 240.

Furthermore, in a case where the head mounted display 20 independently displays AR content without being controlled by the information processing terminal 10, the control unit 230 according to the present embodiment may have a display control function equivalent to that of the control unit 130 of the information processing terminal 10. That is, in this case, the control unit 230 may control a manner of displaying AR content so that a degree of decrease in user's viewing level of the real space is reduced as compared with a case where original content is displayed.

((Output Unit 240))

The output unit 240 according to the present embodiment displays AR content on the basis of control of the control unit 130 or the control unit 230. For this purpose, the output unit 240 according to the present embodiment includes at least a display device arranged in front of the eyes of the user wearing the head mounted display 20. Furthermore, the output unit 240 may include a speaker or the like for outputting sound accompanying the AR content.

((Communication Unit 250))

A communication unit 150 according to the present embodiment performs information communication with the information processing terminal 10 over the network 30.

The functional configuration examples of the information processing terminal 10 and the head mounted display 20 according to the present embodiment have been described above. Note that the configurations described above with reference to FIG. 4 are merely an example, and the functional configurations of the information processing terminal 10 and the head mounted display 20 according to the present embodiment are not limited to such an example. As described above, the head mounted display 20 according to the present embodiment can display AR content independently without being controlled by the information processing terminal 10.

1.4. Detailed Configuration Example

Next, detailed configurations of the information processing terminal 10 and the head mounted display 20 according to the present embodiment will be described with specific examples.

Figure 5:
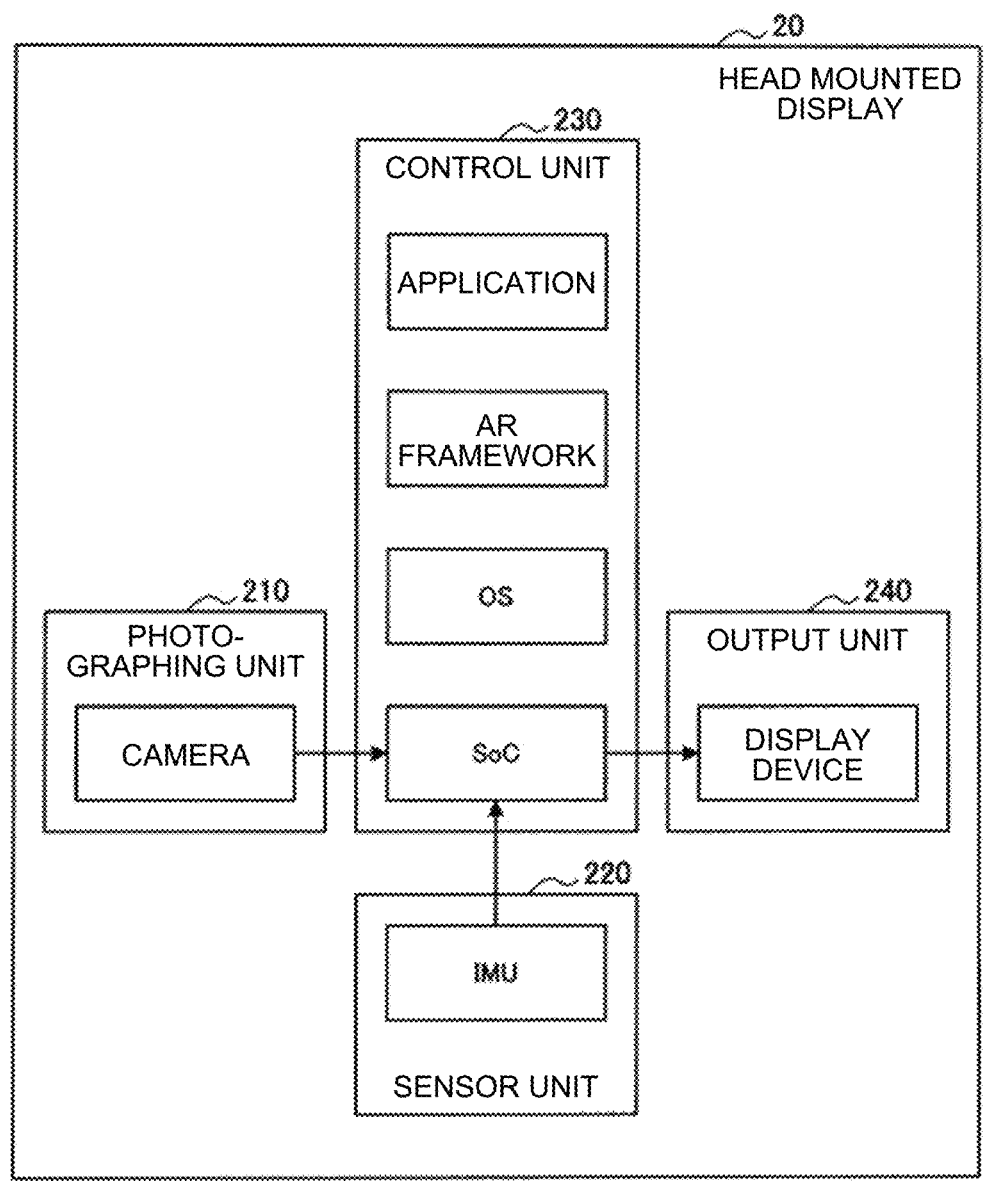
FIG. 5 is a block diagram illustrating an example of a detailed configuration in a case where the head mounted display 20 according to the embodiment independently performs display control of AR content.

As described above, the head mounted display 20 according to the present embodiment can display AR content independently or on the basis of control of the information processing terminal 10. First, a detailed configuration example in a case where the head mounted display 20 according to the present embodiment displays AR content independently will be described. FIG. 5 is a block diagram illustrating an example of a detailed configuration in a case where the head mounted display 20 according to the present embodiment independently performs display control of AR content.

In this case, the control unit 230 includes a system on chip (SoC), an OS, an AR framework, an application, and the like. The control unit 230 generates an environment map and a pose graph (posture graph) by performing simultaneous localization and mapping (SLAM) on the basis of image information photographed by a camera included in the photographing unit 210 and sensor information (acceleration information and angular velocity information) received from an inertial measurement unit (IMU) included in the sensor unit 220.

That is, the control unit 230 can recognize a space (environment map) including an object on the basis of the image information and the sensor information, and can grasp position and posture (pose graph) of the camera in the recognized space.

Figure 6:
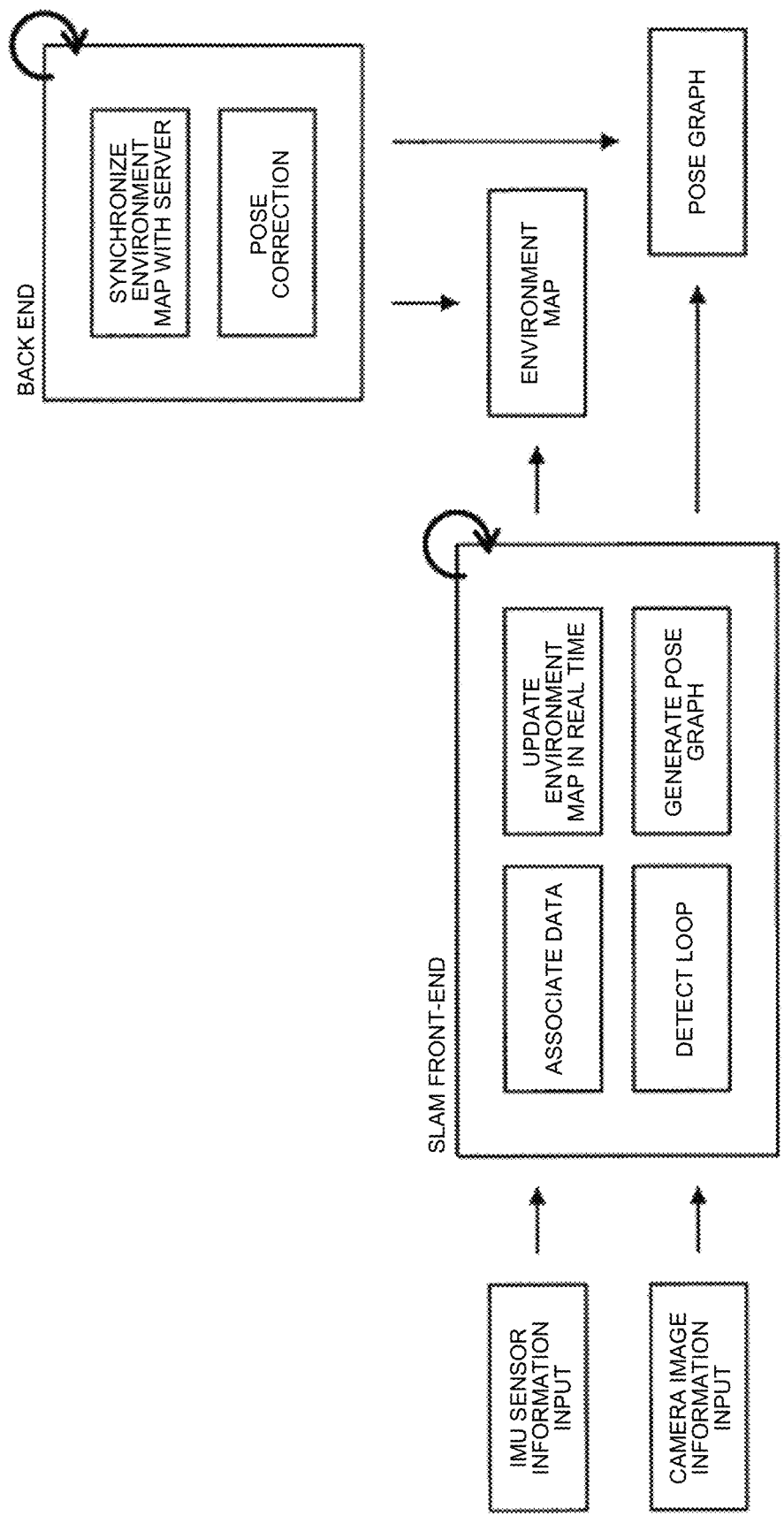
FIG. 6 is a diagram illustrating a configuration example of software for realizing SLAM according to the embodiment.

An example of a software configuration that implements SLAM will be described in detail below. FIG. 6 is a diagram illustrating a configuration example of software for realizing SLAM according to the present embodiment. As illustrated in FIG. 6, the software that realizes SLAM according to the present embodiment may be divided into a front end and a back end.

In the front end, the image information acquired by the photographing unit 210 and the sensor information acquired by the sensor unit 220 are sequentially input, and association of data, real-time update of the environment map, and generation of a pose graph are performed.

Since SLAM is an estimation technique based on sensor information, errors accumulate as the environment map becomes larger. Therefore, when the same point is observed by looping the same path, it is important to significantly reduce the accumulated errors by detecting the loop and closing the loop. Therefore, in the front end, loop detection for detecting such a loop may be executed.

In the back end, batch processing of greatly updating the environment map, such as synchronizing the environment map with the server, is executed. Furthermore, in the back end, pose correction accompanying loop detection and the like are executed. Since the update and use of the environment map increase an amount of calculation, it is possible to reduce the amount of calculation and secure performance by using the pose graph for estimating the position on the basis of movement of the head mounted display 20. Note that the back end may be executed in a thread different from the front end. This makes it possible to perform processing without affecting a real-time property.

The control unit 230 can determine a manner of displaying AR content such as display content, a display position, a size, and a display timing of the AR content on the basis of the environment map and the pose graph generated as described above, and can cause the display device included in the output unit 240 to output the determined manner.

According to the above configuration, AR content can be displayed by the head mounted display 20 alone. On the other hand, in this case, since the control unit 230 performs all the processing related to the SLAM and the display control of AR content, the control unit 230 needs to have abundant calculation resources, which invites an increase in size of the head mounted display 20.

In view of this, according to the information processing method according to the present embodiment, the processing related to the SLAM and the display control of AR content is performed by the information processing terminal 10, so that a processing load on the head mounted display 20 side can be reduced, and the head mounted display 20 can be further reduced in size.

Figure 7:
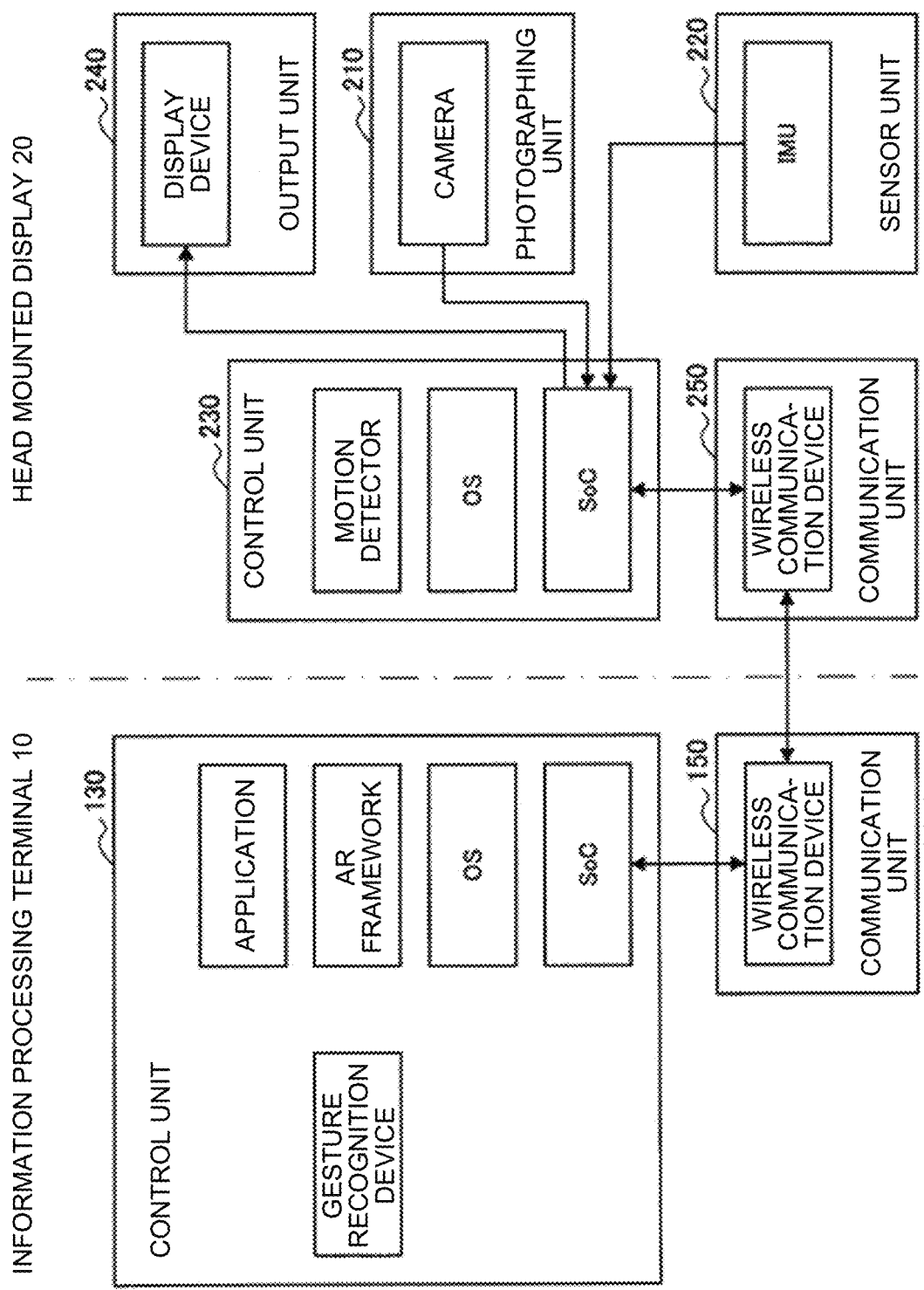
FIG. 7 is a block diagram illustrating an example of a detailed configuration in a case where the information processing terminal 10 performs SLAM and display control of AR content according to the embodiment.

FIG. 7 is a block diagram illustrating an example of a detailed configuration in a case where the information processing terminal 10 performs the SLAM and the display control of AR content according to the present embodiment.

In this case, as illustrated in FIG. 7, the control unit 130 has a configuration similar to the control unit 230 illustrated in FIG. 5. The control unit 130 can receive image information and sensor information from the photographing unit 210 and the sensor unit 220 of the head mounted display 20, respectively over the communication unit 150 and a wireless communication device included in the communication unit 250 and execute processing related to the SLAM and the AR content display.

Note that the control unit 230 may recognize a gesture of the user from the received image information by using a gesture recognition device and control the display of AR content on the basis of a result of the recognition. The gesture recognition function of the control unit 230 according to the present embodiment will be described later.

Furthermore, in this case, the control unit 230 of the head mounted display 20 may detect a difference between pieces of image information input in time series from the photographing unit 210 by using a motion detector, and transmit the image information to the information processing terminal 10 only in a case where the difference is detected, that is, only in a case where there is a change in the image information. According to such control, an amount of transmitted image information can be reduced, and traffic can be effectively suppressed.

1.5. Display Control of AR Content

Next, the display control of AR content according to the present embodiment will be described in detail with a specific example. Although a case where the head mounted display 20 according to the present embodiment displays AR content obtained by removing background excluding a main subject from original content has been described as an example in FIG. 2, the head mounted display 20 according to the present embodiment is not limited to the above example, and can display AR content in various manners. Note that a case where the control unit 130 of the information processing terminal 10 controls display of AR content by the output unit 240 of the head mounted display 20 will be described below as a main example.

For example, in a case where the original content is video content, the control unit 130 according to the present embodiment may control a manner of displaying the AR content according to a reproduced scene of the original content. For example, the control unit 130 according to the present embodiment may cause the output unit 240 to display the AR content corresponding to the reproduced scene only in a case where the reproduced scene of the original content includes a main subject.

Figure 8:
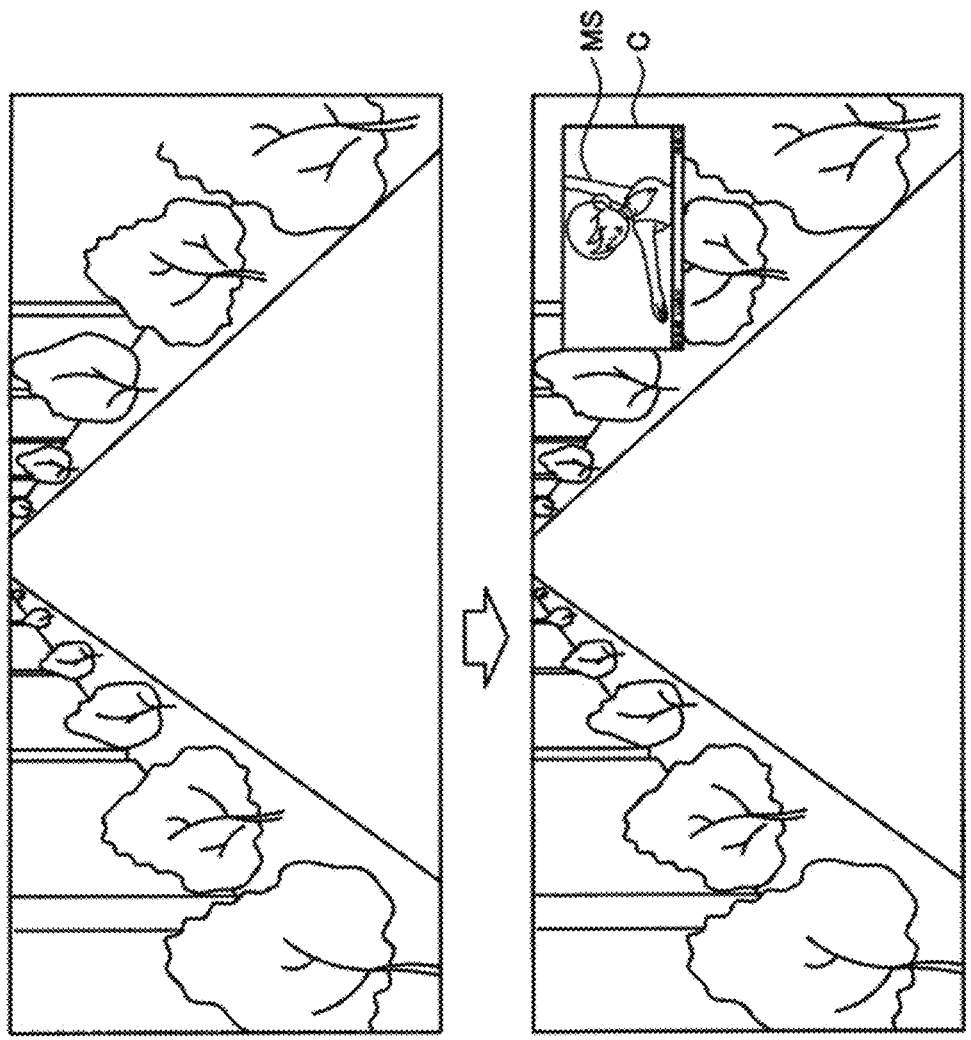
FIG. 8 is a diagram for explaining display control of AR content according to a reproduced scene including a main subject according to the embodiment.

FIG. 8 is a diagram for explaining display control of AR content according to a reproduced scene including a main subject according to the present embodiment. For example, a reproduced scene that does not include a main subject such as an artist is often used in a video content such as a music promotion video. In a case where such video content is continuously displayed as AR content as it is, a situation is assumed in which the user is distracted from a real space by the reproduced scene that changes frequently.

Therefore, as illustrated in FIG. 8, the control unit 130 according to the present embodiment may cause the output unit 240 to display the AR content C corresponding to the reproduced scene only in a case where the reproduced scene includes a main subject MS. According to such control, a display time of the AR content C can be shortened and a degree of decrease in user's viewing level of the real space can be effectively kept small by limiting displayed content of the AR content C to a subject which the user wants to gaze at.

Note that, for example, the control unit 130 may set a person appearing in video content as a main subject and extract a reproduced scene including the main subject by performing face detection processing or the like. Furthermore, the control unit 130 can also extract a reproduced scene including a main subject on the basis of metadata accompanying the video content. For example, in a case where subject information for each reproduced scene (frame) is included in the metadata, the user may be permitted to designate a main subject (for example, only a vocal among persons) that the user wants to view.

Figure 9:
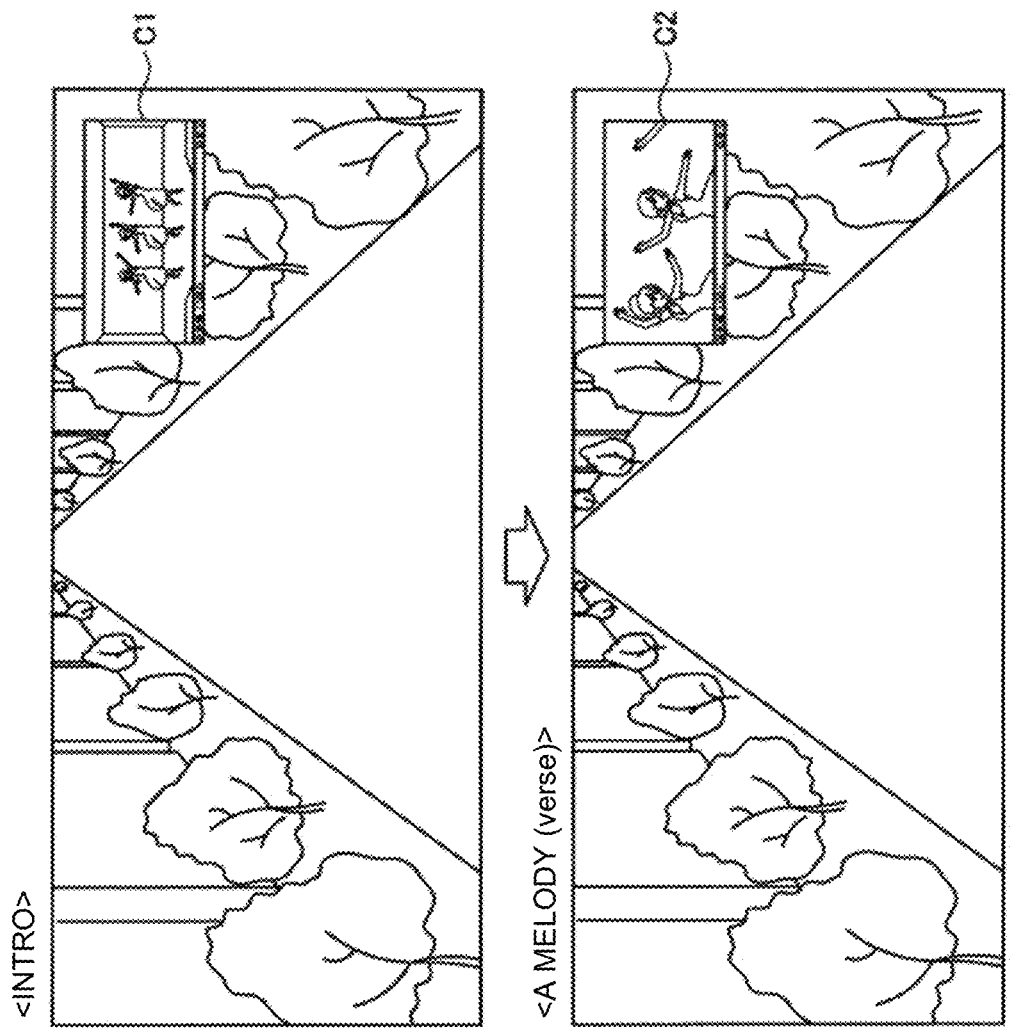
FIG. 9 is a diagram for explaining display control of AR content corresponding to a representative image for each reproduced scene according to the embodiment.

Furthermore, the control unit 130 according to the present embodiment may extract a representative image for each reproduced scene from the original video content and cause the output unit 240 to output the representative image as AR content. FIG. 9 is a diagram for explaining display control of AR content corresponding to the representative image for each reproduced scene according to the present embodiment.

As described above, in a case where video content whose display content changes drastically, such as a music promotion video, is displayed as it is as AR content, there is a possibility that the user is distracted by a reproduced scene that changes frequently.

Therefore, the control unit 130 according to the present embodiment may extract a representative image (still image) for each reproduced scene and cause the output unit 240 to continuously output the representative image as AR content while the same reproduced scene continues.

For example, in the example illustrated in FIG. 9, while a reproduced scene "intro" continues, the control unit 130 continues to cause the output unit 240 to display a representative image of "intro" as AR content C1.

On the other hand, in a case where the reproduced scene is switched to "Verse", the control unit 130 causes the output unit 240 to display a representative image of "Verse" as AR content C and continues the display until the end of "Verse".

According to such display control, visual information representing a reproduced scene is presented to the user while reducing a degree of decrease in user's viewing level of the real space by making a change in the AR content less frequent, and thereby a user's degree of satisfaction can be secured.

Next, display control of AR content according to a reproduced scene and a user's action status according to the present embodiment will be described. During a normal time, for example, as illustrated in FIGS. 8 and 9, the control unit 130 may display the AR content C at a periphery of the field of view of the user. According to such display control, a central portion of the field of view of the user is not blocked, and therefore a degree of decrease in user's viewing level of the real space can be reduced.

On the other hand, in a case where such display is always performed, it is also assumed that a user's degree of satisfaction who wants to view the AR content decreases. In view of this, the control unit 130 according to the present embodiment may dynamically control a display position of the AR content on the basis of a reproduced scene of video content or a user's action status.

Figure 10:
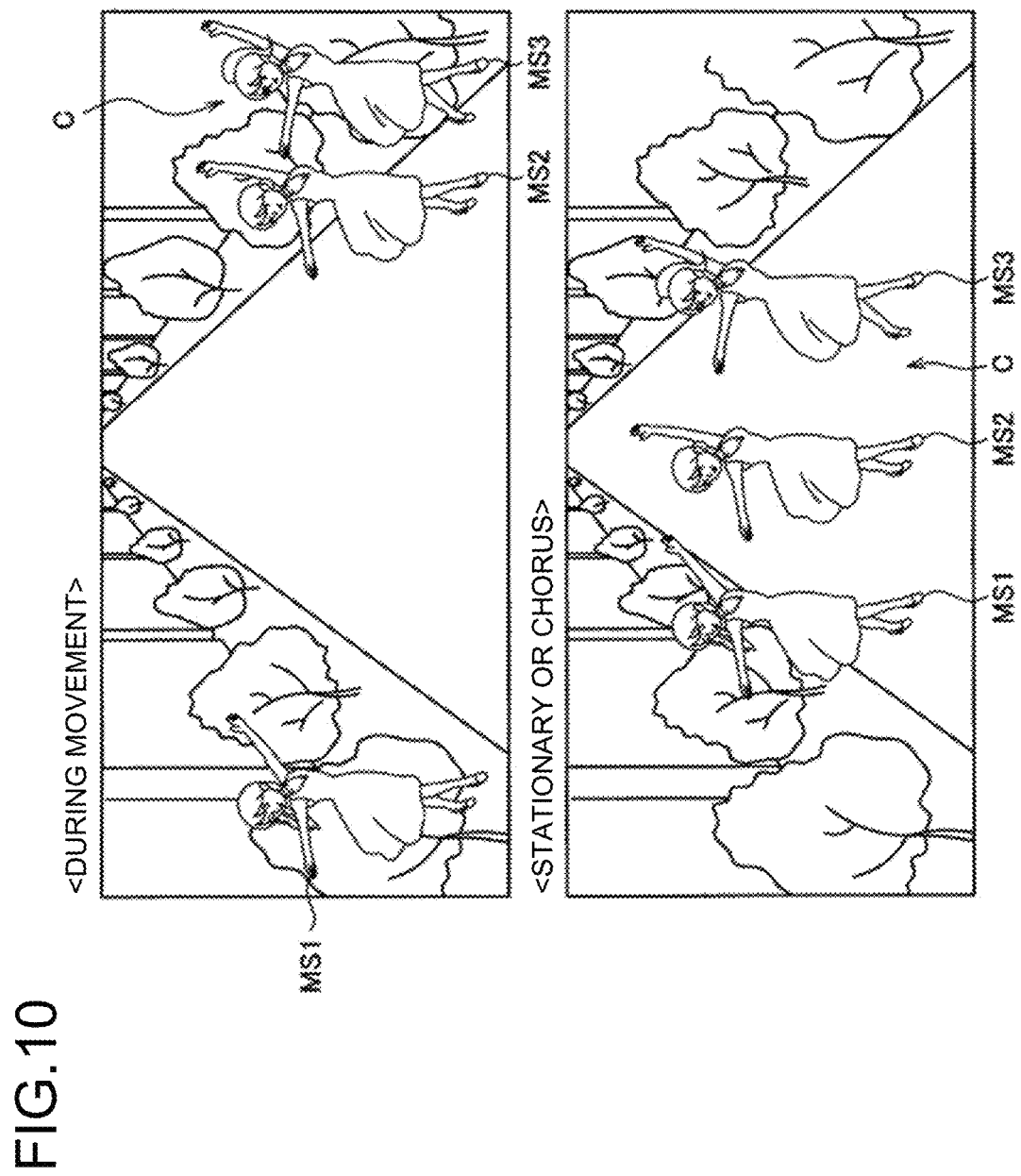
FIG. 10 is a diagram for explaining display position control of AR content based on a reproduced scene or a user's action status according to the embodiment.

FIG. 10 is a diagram for explaining display position control of AR content based on a reproduced scene or a user's action status according to the present embodiment.

The upper part of FIG. 10 illustrates a display example of AR content in a case where the user is performing an action such as walking. In this case, the control unit 130 may display the AR content C in a peripheral portion of the field of view of the user, as described above. According to such display control, it is possible to make the central portion of the field of view of the user unoccupied, thereby reducing a degree of decrease in user's viewing level of the real space.

Note that in a case where the AR content C includes a plurality of main subjects MS1 to MS3 as illustrated in FIG. 10, the control unit 130 may perform control so that the main subjects MS1 to MS3 are displayed separately in a peripheral portion of the field of view of the user.

On the other hand, the lower part of FIG. 10 illustrates a display example of the AR content in a case where the user is stationary or in a case where a reproduced scene is a main scene in the original content.

For example, in a case where the user is stationary, it is assumed that a possibility that the user will collide with another object or trip over is significantly low even if the AR content C is displayed in the central portion of the user's field of view as illustrated in FIG. 10.

Therefore, the control unit 130 according to the present embodiment may display the AR content in the peripheral portion of the user's field of view in a case where the user is moving and may display the AR content in the central portion of the user's field of view in a case where the user is stationary.

Furthermore, for example, in a case where a reproduced scene is a main scene in the original content, such as a chorus part in a music promotion video, it is assumed that the user desires viewing more than other reproduced scenes.

Therefore, the control unit 130 according to the present embodiment may display the AR content in a peripheral portion of the user's field of view in a case where the reproduced scene is not a main scene in the original content and may display the AR content in a central portion of the user's field of view in a case where the reproduced scene is the main scene in the original content.

As described above, the control unit 130 according to the present embodiment can dynamically control a display position of AR content on the basis of a reproduced scene of original content or a user's action status. According to such control, it is possible to realize a higher quality of AR experience by changing a degree of priority for securing a user's field of view or viewing the AR content according to a situation.

Note that the control unit 130 can specify characteristics of each reproduced scene included in original content by analyzing the original content. For example, in a case where the original content is a music promotion video, the control unit 130 may specify characteristics of each reproduced scene on the basis of music data included in the original content.

Figure 11:
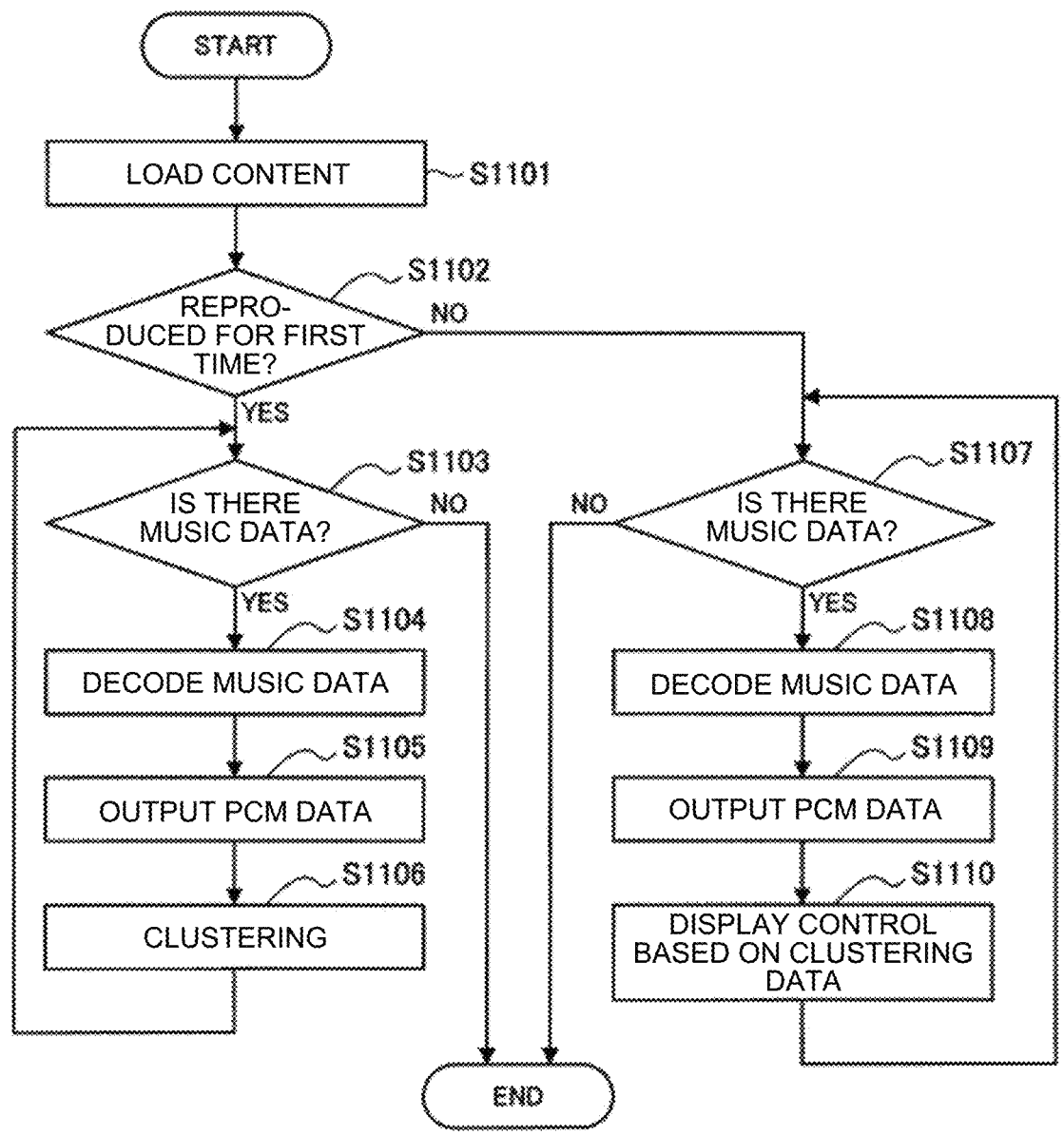
FIG. 11 is a flowchart illustrating a flow of specifying reproduced scene characteristics based on music data and display control of AR content based on the reproduced scene characteristics according to the embodiment.

FIG. 11 is a flowchart illustrating a flow of specifying reproduced scene characteristics based on music data and display control of AR content based on the reproduced scene characteristics according to the present embodiment.

Referring to FIG. 11, first, the control unit 130 loads original content (S1101).

Next, the control unit 130 determines whether or not the content is reproduced for the first time (S1102).

In a case where the content is reproduced for the first time (S1101: YES), the control unit 130 subsequently determines whether or not there is music data (S1103).

In a case where there is no music data (S1103: NO), the control unit 130 ends the processing of the example.

Meanwhile, in a case where there is music data (S1103: YES), the control unit 130 decodes the music data (S1104).

Next, the control unit 130 causes a speaker included in the output unit 240 to output pulse code modulation (PCM) data acquired by the decoding in step S1104 (1105).

Furthermore, the control unit 130 performs Fourier transform on the PCM data and executes clustering based on a power spectrogram thus acquired (S1106).

According to the above clustering, for example, it is possible to classify parts that are similar in whether or not there is output of instruments or vocal, or tone, tempo, or the like as a cluster, that is, a reproduced scene.

Figure 12:
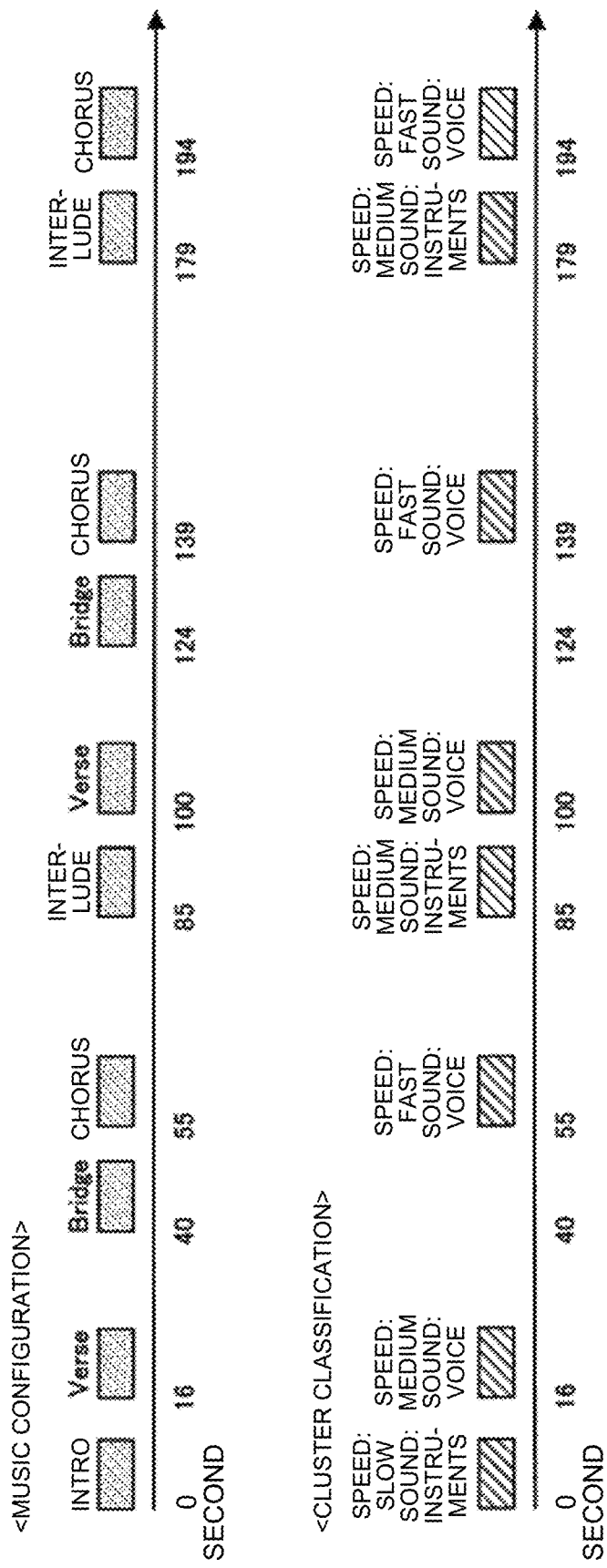
FIG. 12 is a diagram illustrating an example of clustering based on music data according to the embodiment.

FIG. 12 is a diagram illustrating an example of clustering based on music data according to the present embodiment. The upper part of FIG. 12 illustrates a part configuration of a piece of music "ABC". In the example illustrated in FIG. 12, the music ABC includes intro, verse, bridge, chorus, interlude, and outro.

In a case where the clustering is performed, reproduced scenes of the music data "ABC" can be classified as illustrated in the lower part of FIG. 12. Note that numbers in FIG. 12 each indicate an elapsed time from the beginning of the content. Such clustering data may be used for second or subsequent reproduction of the content.

A flow of display control of AR content based on characteristics of reproduced scenes will be described by referring to FIG. 11 again. In a case where the content is not reproduced for the first time in step S1102, that is, in a case where the content is reproduced for the second or subsequent time, the control unit 130 determines whether or not there is music data (S1107).

In a case where there is no music data (S1107: NO), the control unit 130 ends the series of processing.

Meanwhile, in a case where there is music data (S1107: YES), the control unit 130 decodes the music data (S1108).

Next, the control unit 130 causes the speaker included in the output unit 240 to output PCM data acquired by the decoding in step S1108 (1109).

Furthermore, the control unit 130 controls display of the AR content on the basis of the clustering data acquired in step S1106 at the time of the first reproduction of the content (S1110).

For example, in a case where a reproduced scene corresponds to a cluster "speed: fast, sound: voice", the control unit 130 may determine that the reproduced scene is a main scene in the original content and display the AR content C in the central part of the user's field of view as illustrated in the lower part of FIG. 10. As described above, according to the clustering according to the present embodiment, it is possible to change movement of AR content according to a speed of music or change expression of the AR content according to a property of sound. For example, in the case of "sound: voice", superimposed display for mainly displaying a person may be performed, and in the case of "sound: instruments", an effect on background is focused, so that it can be used as an input for improving expressive power of the music scene.

As described above, the control unit 130 according to the present embodiment can specify characteristics of a reproduced scene included in original content by analyzing music data or the like and perform display control of AR content on the basis of the characteristics. Note that the above method is merely an example, and an analysis method related to a reproduced scene may be appropriately selected according to the type of original content. Furthermore, the control unit 130 can also acquire characteristics of a reproduced scene from metadata or the like accompanying original content.

Although an example in which clustering of music data is performed by the information processing terminal 10 has been described above, clustering of music data may be performed by a server separately provided. In this case, clustering of music data is performed in advance in the server, and clustering data is stored. When reproducing AR content, each user can view the AR content according to characteristics of a reproduced scene by receiving the clustering data through communication with the server.

In this case, clustering data may be prepared only for representative pieces of content instead of generating clustering data in advance for all pieces of content including music data. For example, pieces of content that have been reproduced by users a predetermined number of times or more may be set as representative content or pieces of content that are located at the top in total number of reproductions during a predetermined period may be set as representative content.

Next, display control of AR content based on a result of recognition of an object existing in a real space according to the present embodiment will be described. For example, in a case where an advertisement medium existing in the real space is recognized, the control unit 130 according to the present embodiment may display AR content at a position corresponding to the advertisement medium.

Figure 13:
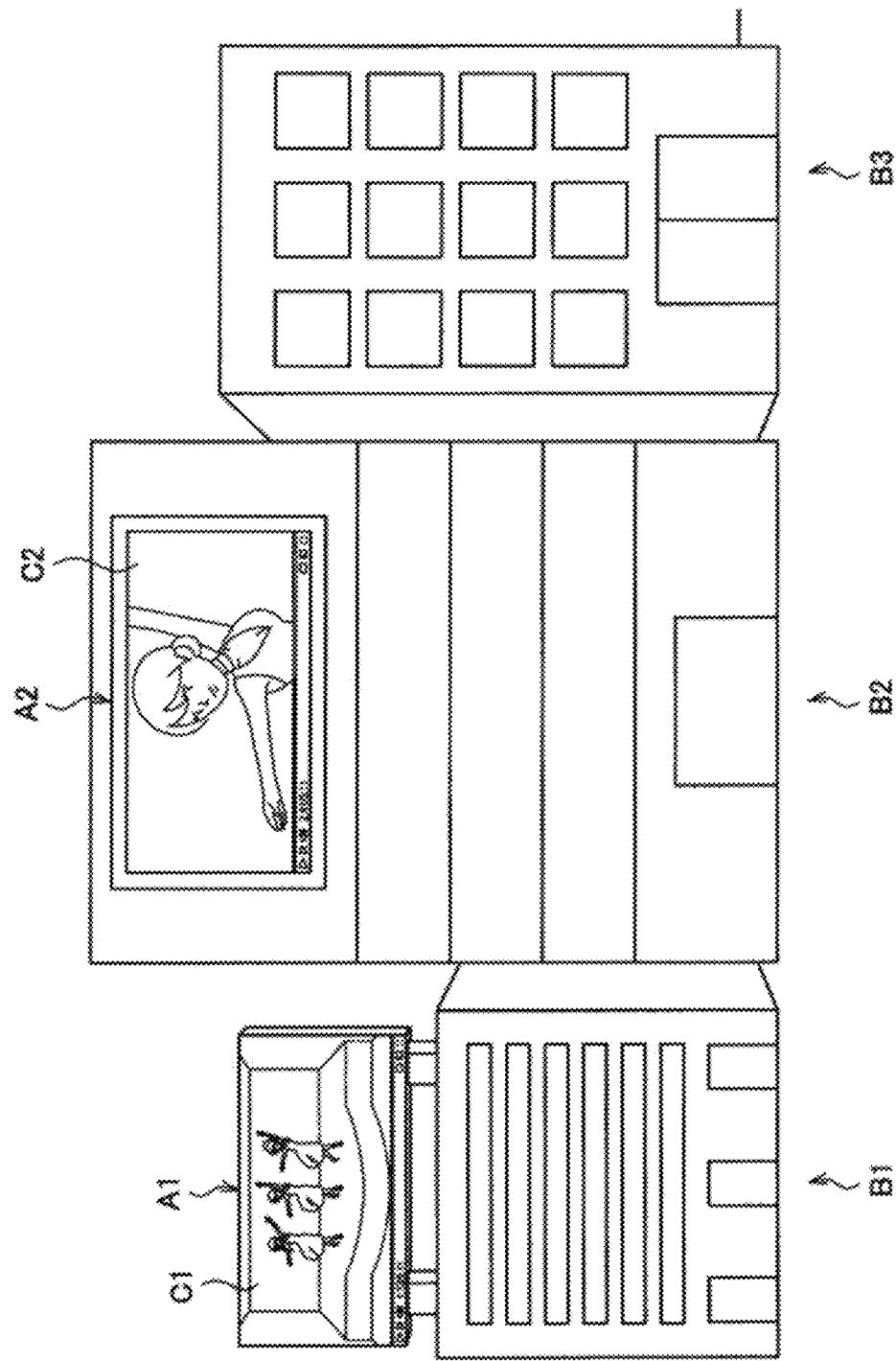
FIG. 13 is a diagram for explaining display control of AR content based on a result of recognition of an object existing in a real space according to the embodiment.

FIG. 13 is a diagram for explaining display control of AR content based on a result of recognition of an object existing in the real space according to the present embodiment. FIG. 13 illustrates buildings B1 to B3 existing in the real space. Advertisement media A1 and A2 are installed in the buildings B1 and B2, respectively. The advertisement medium A1 may be, for example, a signboard advertisement, and the advertisement medium A2 may be, for example, a large-sized display.

The control unit 130 can recognize the advertisement media A1 and A2 on the basis of image information photographed by the photographing unit 210 of the head mounted display 20. For example, the control unit 130 may recognize the advertisement media A1 and A2 by using a detector that detects a rectangular region.

In this case, the control unit 130 can display AR content C1 and AR content C2 at positions corresponding to the recognized advertisement media A1 and A2, respectively. According to such control, an advertisement medium existing in the real space can be used as a display medium of AR content, and it is possible to realize natural AR display that fits the scenery without narrowing a user's field of view.

Note that the control unit 130 may use not only an advertisement medium but also various rectangular regions to display AR content. For example, the control unit 130 can detect a plurality of windows of the building B3 as rectangular regions and display AR content in the rectangular regions.

Furthermore, the control unit 130 according to the present embodiment may control the display of AR content on the basis of detection of a plane such as a wall in front of the user. For example, in the example illustrated in FIG. 14, the control unit 130 detects a wall W in front of the user on the basis of image information photographed by the photographing unit 210 of the head mounted display 20.

In this case, the control unit 130 may display AR content C1 related to notification of a message received before the detection of the wall W to have superimposed display on the wall W.

For example, in a case where a message such as an SNS message is received during walking, displaying a notification related to the message as immediate AR content irrespective of a situation may attract user's attention more than necessary, thereby lowering a user's viewing level of the real space.

Therefore, the control unit 130 performs AR display related to notification of a message in a case where a plane such as a wall or a screen is detected and the user has stopped walking, allowing the user to check the message in a safer situation.

The same applies, for example, to a video call or the like, and in a case where a plane such as the wall W is detected, AR content C2 displayed in a peripheral portion of the user's field of view before the detection may be displayed in a central portion of the user's field of view. As described above, the control unit 130 according to the present embodiment can control a manner of displaying AR content on the basis of a result of recognition of various objects existing in the real space.

Note that, in addition to such control, the control unit 130 can also control a manner of displaying AR content on the basis of, for example, a color of a recognized object or plane. For example, AR content is easy to visually recognize when background is black but is hard to visually recognize when the background color is light. In view of this, for example, the control unit 130 may correct an entire image so that AR content becomes easy to visually recognize with respect to luminance of the recognized object or plane or may display the AR content at a more easily visible position.

Next, display control of AR content based on gesture recognition according to the present embodiment will be described. The control unit 130 according to the present embodiment may recognize a user's gesture on the basis of image information photographed by the photographing unit 210 of the head mounted display 20 and control a manner of displaying AR content on the basis of the gesture.

Figure 14:
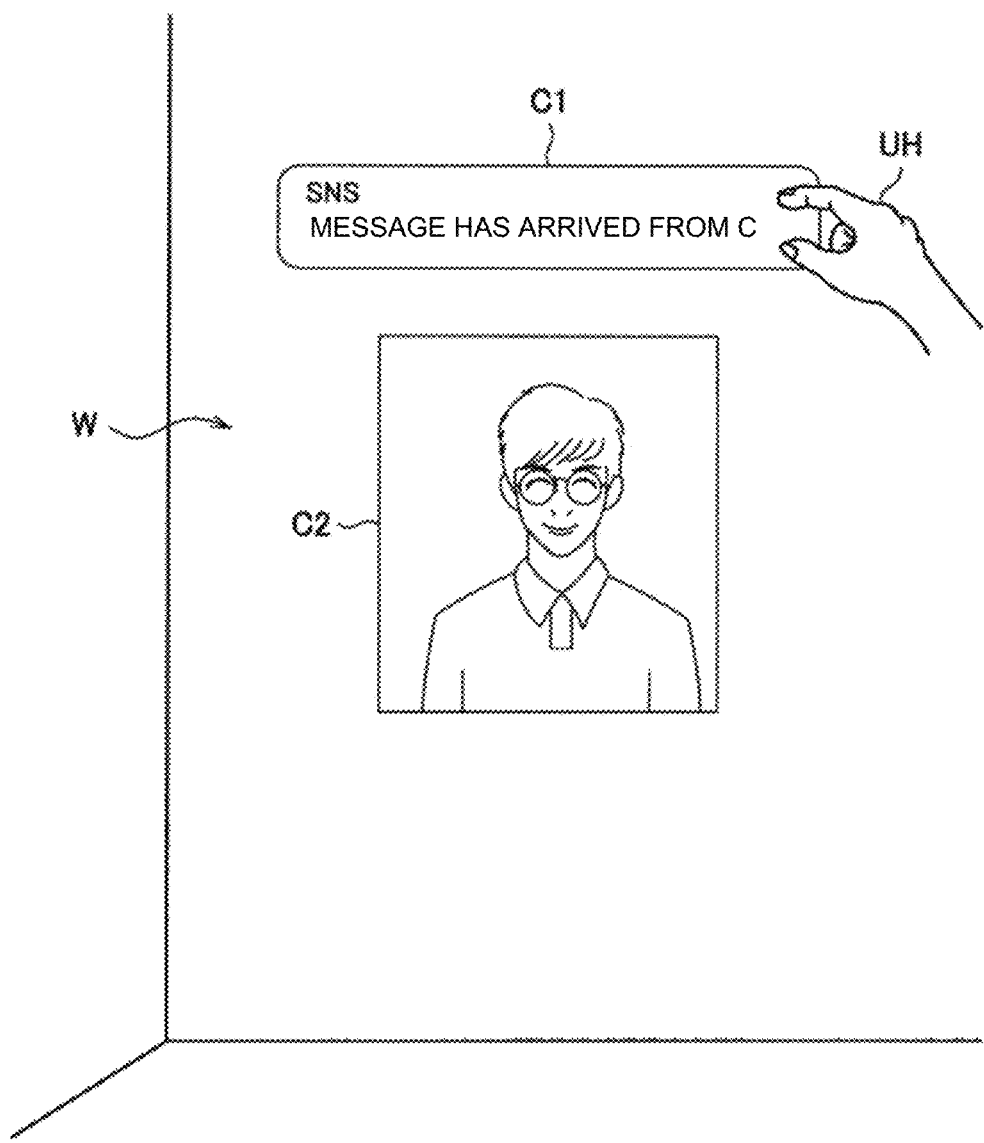
FIG. 14 is a diagram illustrating an example of display control of AR content based on a gesture of a user according to the embodiment.

For example, in the example illustrated in FIG. 14, the user performs a gesture of pinching the AR content C1 by using a hand UH. In this case, for example, the control unit 130 may determine that the input is similar to a tapping action on the information processing terminal 10 and control a manner of displaying the AR content C1 according to the input.

Furthermore, for example, in a case where the user moves the hand UH up, down, left, right, or the like while pinching the AR content C1, the control unit 130 may determine that the input is similar to a dragging action on the information processing terminal 10 and control a manner of displaying the AR content C1 according to the input.

According to such control, the user can easily and intuitively operate an application without taking out the information processing terminal 10 each time, and a more convenient AR experience can be provided.

Figure 15:
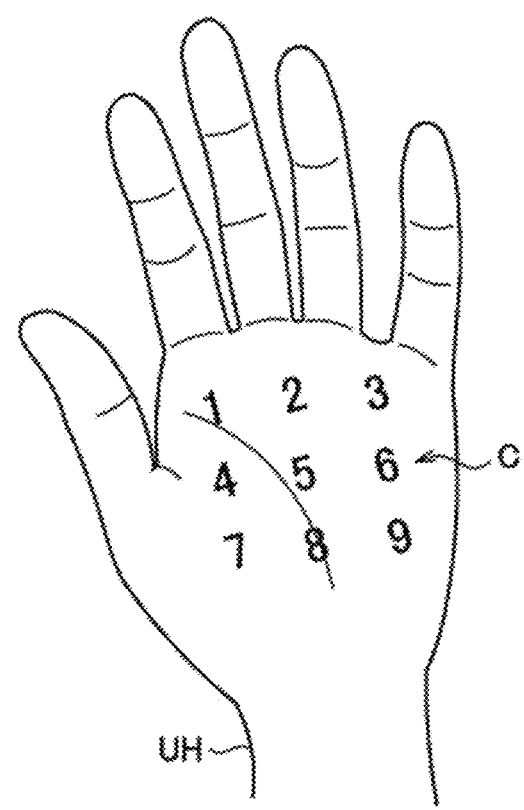
FIG. 15 is a diagram illustrating an example of display control of AR content based on a gesture of a user according to the embodiment.

Furthermore, the control unit 130 according to the present embodiment can also cause the output unit 140 to display AR content for accepting a gesture corresponding to a user's key input. For example, in the example illustrated in FIG. 15, the control unit 130 recognizes that the user has gazed at the hand UH and displays AR content C for accepting input of numeric keys on the hand UH.

In this case, when the user performs a gesture of pressing the AR content C superimposed on his or her hand UH with the other hand, the user can input a desired number while obtaining tactile feedback related to a pressed position. The control unit 130 can specify a number that the user desires to input by associating the display position of the AR content C with a user's gesture position.

Display control of AR content based on gesture recognition according to the present embodiment has been described above. Next, generation of AR content based on virtual reality (VR) content according to the present embodiment will be described.

Unlike AR content, in the case of VR content, an image is displayed on a user's entire field of view, and it is therefore very difficult to enjoy VR content while moving outdoors. Therefore, in the present embodiment, by reconstructing VR content as AR content, the user is allowed to easily enjoy favorite content outdoors.

Figure 16:
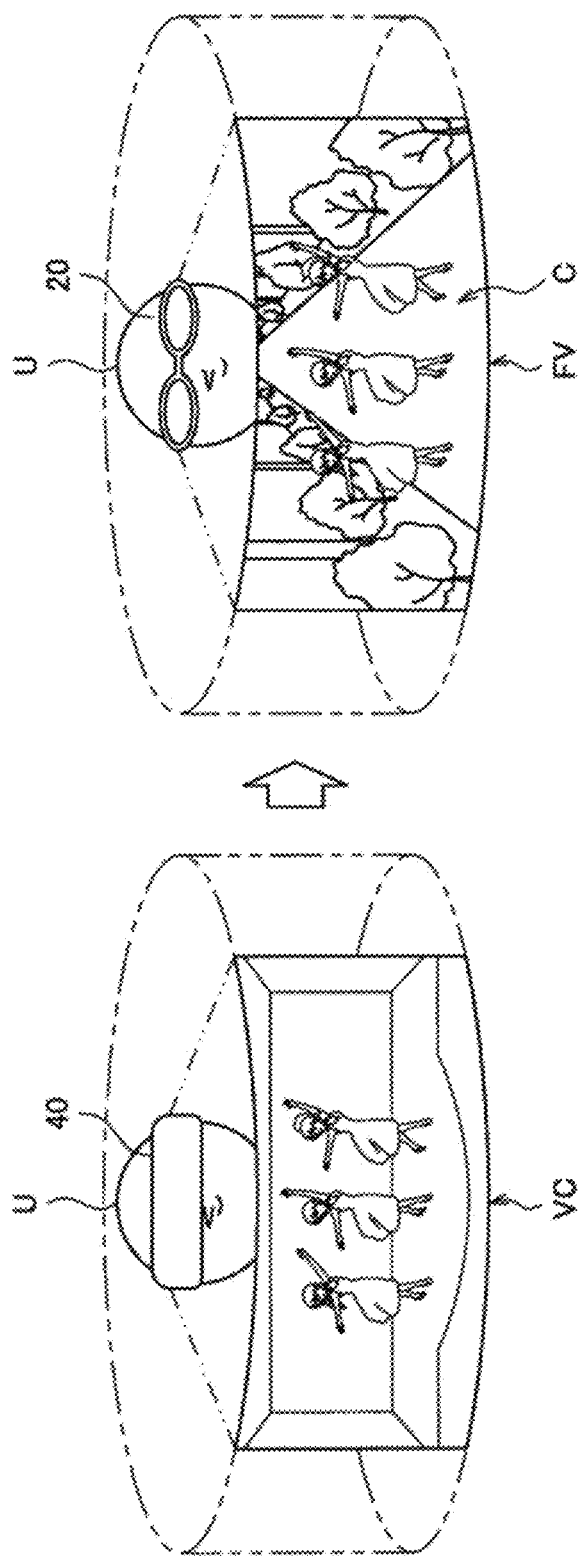
FIG. 16 is a diagram for explaining generation of AR content based on VR content according to the embodiment.

FIG. 16 is a diagram for explaining generation of AR content based on VR content according to the present embodiment. The left side of FIG. 16 illustrates a state in which a user U views 360-degree VR content VC by using a VR device 40.

For example, the control unit 130 extracts a moving object from the VR content VC and removes a background excluding the object. Next, as illustrated on the right side in the Figure, the control unit 130 superimposes the extracted object as AR content C on a field of view FV so that the object is arranged in a direction corresponding to a direction on the VR content VC of the user.

According to such control, the user can easily enjoy favorite content outdoors. As described above, original content according to the present embodiment may be VR content.

Figure 17:
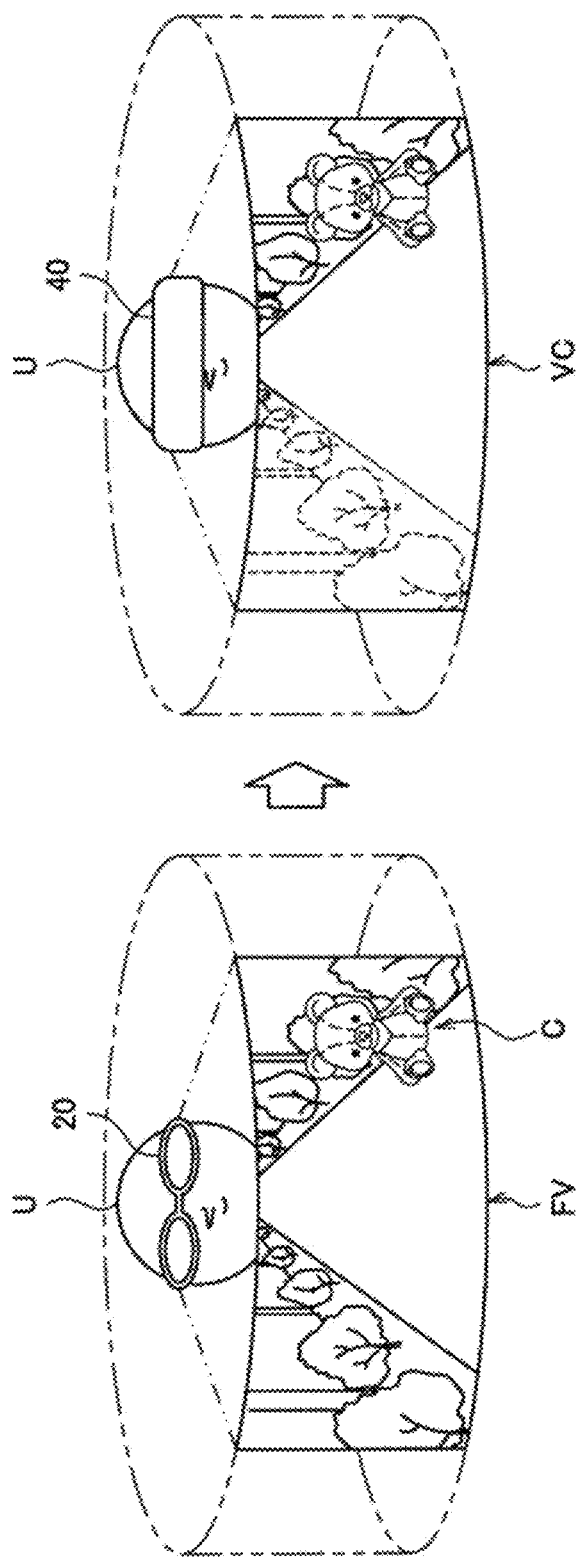
FIG. 17 is a diagram for explaining generation of VR content based on AR content according to the embodiment.

Contrary, the control unit 130 according to the present embodiment can also generate VR content on the basis of AR content. FIG. 17 is a diagram for explaining generation of VR content based on AR content according to the present embodiment.

The left side of FIG. 17 illustrates a state in which the user U views AR content C superimposed on the field of view FV by using the head mounted display 20. In this case, the control unit 130 stores image information photographed by the photographing unit 210 of the head mounted display 20 and image information of the AR content C displayed on the output unit 240 in a VR format together with display position information (posture information of the head mounted display 20).

Furthermore, the right side of FIG. 17 illustrates a state in which the user U views VR content VC saved as described above by using the VR device 40. The VR device 40 may complement image information in a direction that is not photographed by the photographing unit 210 of the head mounted display 20 by using, for example, an image generator using a machine learning method.

Figure 18:
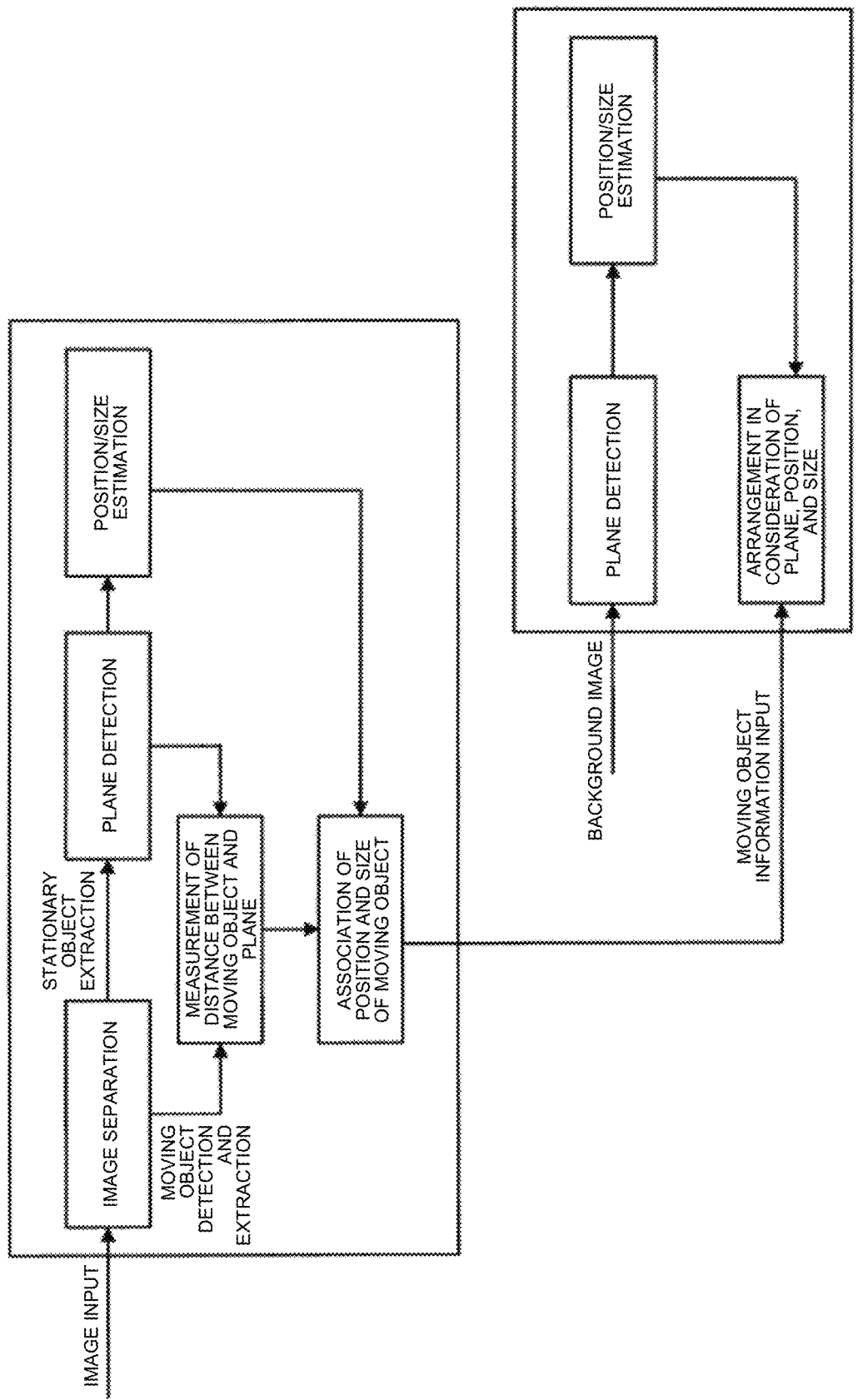
FIG. 18 is a diagram for explaining storage of image information in a VR format according to the embodiment.
Figure 19:
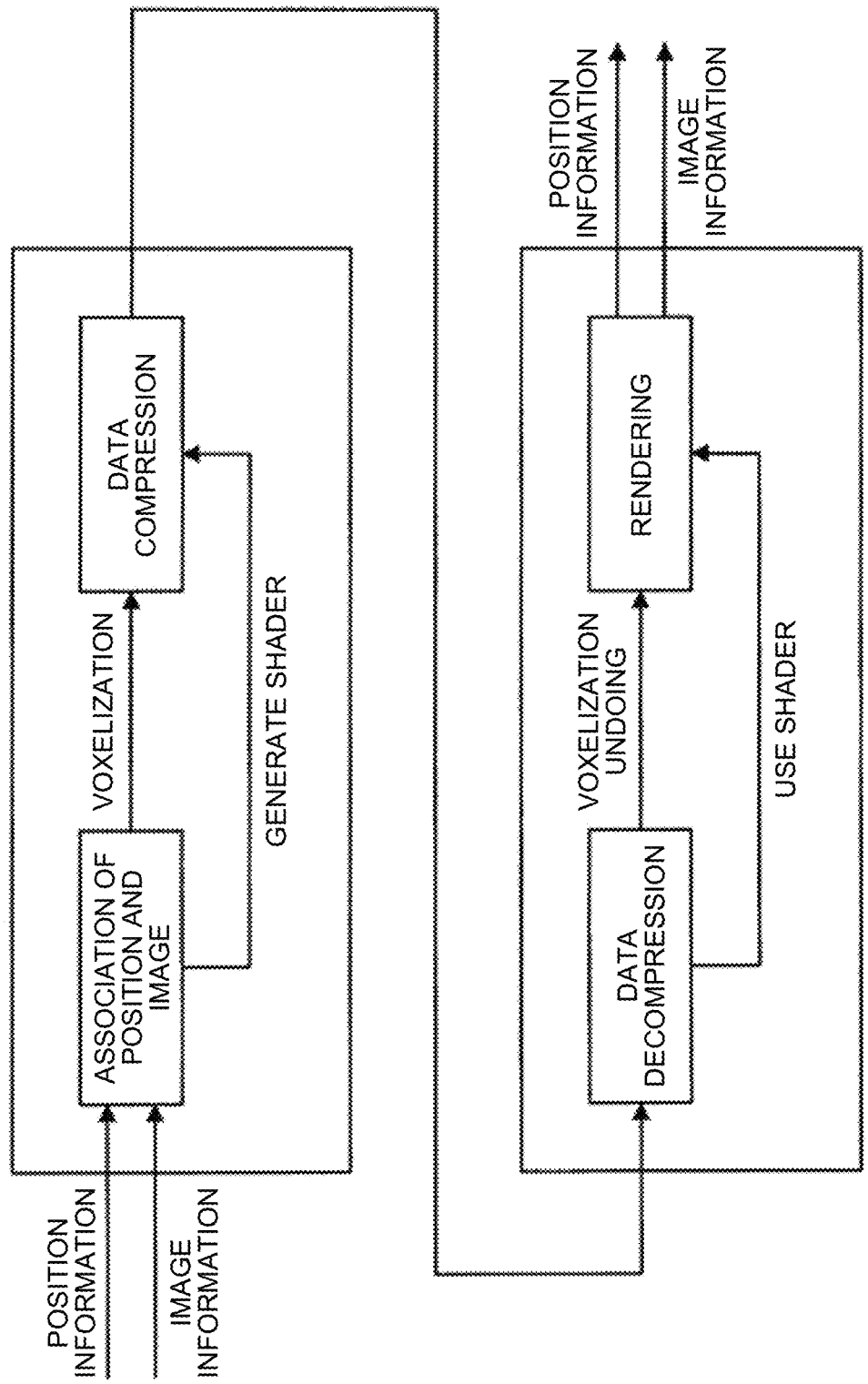
FIG. 19 is a diagram for explaining storage of image information in a VR format according to the embodiment.

Processing for storing image information related to the user's field of view FV in a VR format will be described in more detail below. FIGS. 18 and 19 are diagrams for explaining VR format storage of image information according to the present embodiment.

As illustrated in the upper part of FIG. 18, the control unit 130 first analyzes content. The control unit 130 first performs separation processing on an image input from the photographing unit 210 of the head mounted display 20. Specifically, the control unit 130 separates elements included in the image into a stationary object such as a background and a moving object including a person. Furthermore, the control unit 130 further detects a plane such as the ground from the extracted stationary object.

Next, the control unit 130 measures a distance between the detected moving object and the plane and estimates position and size of the plane.

Subsequently, the control unit 130 associates the positions and sizes between the plane and the moving object from the measured distance between the moving object and the plane and the estimated position and size of the plane.

Next, as illustrated in the lower part of FIG. 18, the control unit 130 performs processing of arranging the moving object acquired as described above on a background image for VR content.

First, the control unit 130 detects a plane from the background image and estimates position and size of the plane. Next, the control unit 130 arranges the moving object on the background image on the basis of the estimated position and size of the plane and the relationship in position and size between the plane and the moving object acquired in the content analysis described above. According to such processing, position and size of a moving object such as a person can be naturally positioned with respect to position and size of a background.

Subsequently, as illustrated in the upper part of FIG. 19, the control unit 130 performs voxelization and data compression of the arranged moving object. The control unit 130 executes the voxelization by associating the position information of the moving object with the image information. A voxel refers to regular grid data in a three-dimensional space. That is, the control unit 130 converts image information of the moving object into 3D point cloud data. Furthermore, the control unit 130 generates a shader for smoothing the 3D point cloud data.

Next, the control unit 130 compresses and stores the 3D point cloud data, the shader, the position information, and the color information acquired as described above. As described above, the control unit 130 according to the present embodiment can generate VR content based on AR content and image information obtained by photographing a real space.

Next, reproduction of VR content by the VR device 40 will be described. As illustrated in the lower part in the Figure, the VR device 40 first performs expansion processing of the compressed data. Next, the VR device 40 can acquire the position information and the image information related to the moving object and can express the moving object in a volumetric space by undoing the voxelization and performing rendering processing by using the shader.

Next, sharing of an AR experience using AR cloud according to the present embodiment will be described. In the above description, the configuration and control in a case where a user enjoys AR content by himself or herself have been mainly described. On the other hand, according to the information processing method according to the present embodiment, it is also possible to share an AR experience among a plurality of users by sharing information regarding an object in the real space over the cloud.

Figure 20:
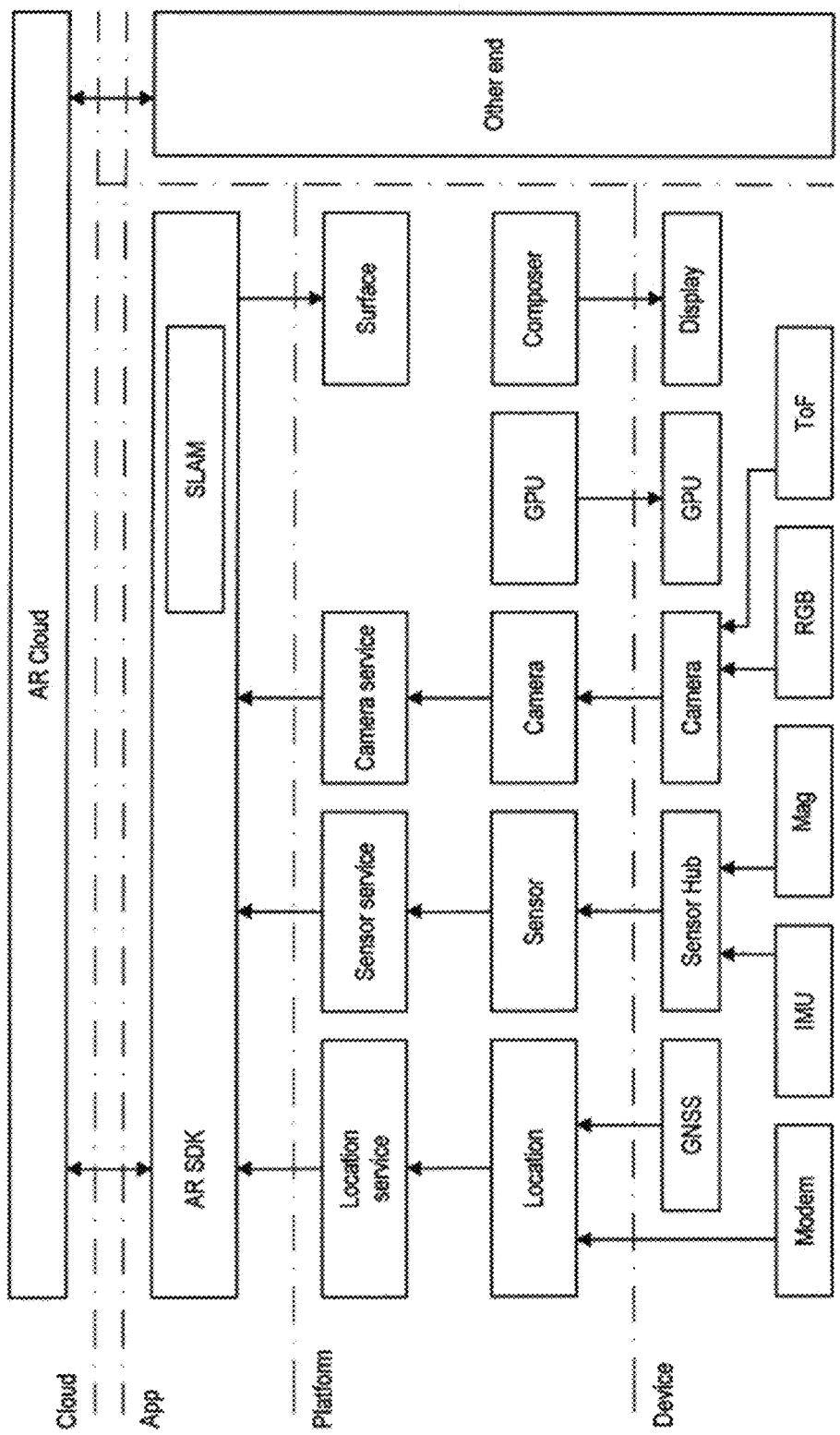
FIG. 20 is a diagram illustrating a hardware configuration example according to an embodiment of the present disclosure.

FIG. 20 is a diagram illustrating an example of a system configuration that realizes sharing of an AR experience by an AR cloud according to the present embodiment. In FIG. 20, a system configuration for realizing sharing of an AR experience by an AR cloud is illustrated in three layers of a device, a platform, and an application.

The device layer is a layer for input/output related to display of AR content, and includes, for example, a modem, a GNSS signal receiver, an IMU, a geomagnetic sensor, a camera (RGB, ToF), a display, a GPU, and the like.

The platform layer is a layer that relays between the device layer and the application layer, and includes various services.

The application layer is a layer for SLAM and display control of AR content, and associates data stored in the AR cloud and data stored locally. Specifically, in the application layer, point cloud data of a three-dimensional space stored in the AR cloud is associated with locally acquired SLAM data, and thereby position and posture of the local terminal in the three-dimensional space are specified.

By acquiring coordinates of AR content displayed by a user's own terminal in the three-dimensional space with high accuracy and uploading the acquired coordinate information to the AR cloud, it is possible to display the AR content on another terminal.

On the contrary, by downloading image information and coordinate information of AR content uploaded from another terminal to the AR cloud and associating the coordinate information with SLAM data of a user's own terminal, the AR content uploaded by the other terminal can be displayed at an accurate position.

As described above, according to the information processing method according to the present embodiment, it is possible to share an AR experience among a plurality of users by sharing information regarding an object in a real space over the cloud.

2. Summary

As described above, the information processing apparatus according to an embodiment of the present disclosure includes a control unit that controls display of AR content by a display device arranged in front of user's eyes. Furthermore, one of features of the control unit according to an embodiment of the present disclosure is to control a manner of displaying the AR content so that a degree of decrease in the user's viewing level of the real space is reduced as compared with a case where original content is displayed. According to such a configuration, it is possible to view AR content fused with the real space more safely.

Although the preferred embodiment of the present disclosure has been described in detail above with reference to the accompanying drawings, the technical scope of the present disclosure is not limited to such an example. It is clear that a person skilled in the art of the present disclosure can arrive at various changes or modifications within the scope of the technical idea recited in the claims, and it is understood that such changes or modifications also belongs to the technical scope of the present disclosure.

In addition, the effects described herein are merely explanatory or illustrative and are not restrictive. That is, the technique according to the present disclosure may exhibit other effects apparent to those skilled in the art from the description of the present specification in addition to or instead of the above effects.

Furthermore, it is also possible to create a program for causing hardware such as a CPU, a ROM, and a RAM built in a computer to exhibit functions equivalent to the configurations of the information processing terminal 10 and the head mounted display 20, and a non-transitory computer-readable recording medium recording the program can also be provided.

Furthermore, the steps related to the processing of the information processing terminal 10 in the present specification are not necessarily performed in time series in the order described in the flowchart. For example, the steps related to the processing of the information processing terminal 10 may be performed in an order different from the order described in the flowchart or may be performed in parallel.

Note that the following configurations also belong to the technical scope of the present disclosure.

(1)

An information processing apparatus comprising: a control unit that controls display of AR content by a display device arranged in front of eyes of a user, wherein the control unit controls a manner of displaying the AR content so that a degree of decrease in a user's viewing level of a real space is reduced as compared with a case where original content is displayed.

(2)

The information processing apparatus according to (1), wherein
the manner of displaying includes at least one of display content, a display position, and a display timing.

(3)

The information processing apparatus according to (2), wherein
the control unit causes the display device to display the AR content in which a background excluding a main subject has been removed from the original content.

(4)

The information processing apparatus according to (2) or (3), wherein
the control unit causes the AR content to be displayed in a peripheral portion of a field of view of the user.

(5)

The information processing apparatus according to (3), wherein
in a case where the original content includes a plurality of the main subjects, the control unit performs control so that the plurality of main subjects are displayed separately in a peripheral portion of a field of view of the user.

(6)

The information processing apparatus according to any one of (2) to (5), wherein
the control unit controls a display position of the AR content on a basis of an action status of the user.

(7)

The information processing apparatus according to (6), wherein
the control unit causes the AR content to be displayed in a peripheral portion of a field of view of the user in a case where the user is moving, and causes the AR content to be displayed in a central portion of the field of view of the user in a case where the user is stationary.

(8)

The information processing apparatus according to any one of (2) to (7), wherein
the original content is video content, and
the control unit controls the manner of displaying the AR content according to a reproduced scene of the original content.

(9)

The information processing apparatus according to (8), wherein
the control unit causes the AR content corresponding to the reproduced scene to be displayed only in a case where the reproduced scene includes a main subject.

(10)

The information processing apparatus according to (8), wherein
the control unit causes a representative image for each reproduced scene to be displayed as the AR content.

(11)

The information processing apparatus according to (8), wherein
the control unit causes the AR content to be displayed in a peripheral portion of a field of view of the user in a case where the reproduced scene is not a main scene in the original content, and causes the AR content to be displayed in a central portion of the field of view of the user in a case where the reproduced scene is a main scene in the original content.

(12)

The information processing apparatus according to any one of (2) to (11), wherein
the control unit controls the manner of displaying the AR content on a basis of a result of recognition of an object existing in the real space.

(13)

The information processing apparatus according to (12), wherein
in a case where a rectangular region existing in the real space is detected, the control unit causes the AR content to be displayed at a position corresponding to the rectangular region.

(14)

The information processing apparatus according to (12) or (13), wherein
in a case where an advertisement medium existing in the real space is recognized, the control unit causes the AR content to be displayed at a position corresponding to the advertisement medium.

(15)

The information processing apparatus according to (3), wherein
the original content is VR content.

(16)

The information processing apparatus according to any one of (2) to (15), wherein
the control unit controls the manner of displaying the AR content on a basis of a gesture of the user.

(17)

The information processing apparatus according to any one of (2) to (16), wherein
the control unit generates VR content based on the AR content and image information obtained by photographing the real space.

(18)

The information processing apparatus according to any one of (1) to (17), further comprising a communication unit that performs wireless communication with a head mounted display,
wherein
the communication unit receives image information of the real space photographed by a photographing unit included in the head mounted display and sensor information acquired by a sensor unit included in the head mounted display, and
the control unit causes the display device included in the head mounted display to display the AR content on a basis of the image information and the sensor information.

(19)

An information processing method comprising controlling, by a processor, display of AR content by a display device arranged in front of eyes of a user,
wherein the controlling further includes controlling a manner of displaying the AR content so that a degree of decrease in user's viewing level of a real space is reduced as compared with a case where original content is displayed.

(20)

A program for causing a computer to function as an information processing apparatus including a control unit that controls display of AR content by a display device arranged in front of eyes of a user,
wherein the control unit controls a manner of displaying the AR content so that a degree of decrease in user's viewing level of a real space is reduced as compared with a case where original content is displayed.

REFERENCE SIGNS LIST

10 INFORMATION PROCESSING TERMINAL
130 CONTROL UNIT
150 COMMUNICATION UNIT
20 HEAD MOUNTED DISPLAY
210 PHOTOGRAPHING UNIT
220 SENSOR UNIT
230 CONTROL UNIT
240 OUTPUT UNIT
250 COMMUNICATION UNIT

The invention claimed is:

1. An information processing apparatus comprising:
circuitry that
controls display of Augmented Reality (AR) content by a display device arranged in front of eyes of a user,
wherein the circuitry controls a manner of displaying the AR content so that a degree of decrease in a user's viewing level of a real space is reduced as compared with a case where original content is displayed,
the manner of displaying includes at least one of display content, a display position, and a display timing,
the circuitry controls a display position of the AR content on a basis of an action status of the user, and
the circuitry causes the AR content to be displayed in a peripheral portion of a field of view of the user in a case where the user is moving, and causes the AR content to be displayed in a central portion of the field of view of the user in a case where the user is stationary.

2. The information processing apparatus according to claim 1, wherein the circuitry control unit causes the display device to display the AR content in which a background excluding a main subject has been removed from the original content.

3. The information processing apparatus according to claim 2, wherein in a case where the original content includes a plurality of the main subjects, the circuitry performs control so that the plurality of main subjects are displayed separately in a peripheral portion of a field of view of the user.

4. The information processing apparatus according to claim 2, wherein the original content is VR content.

5. The information processing apparatus according to claim 1, wherein the circuitry causes the AR content to be displayed in a peripheral portion of a field of view of the user.

6. The information processing apparatus according to claim 1, wherein
the original content is video content, and
the circuitry controls the manner of displaying the AR content according to a reproduced scene of the original content.

7. The information processing apparatus according to claim 6, wherein the circuitry causes the AR content corresponding to the reproduced scene to be displayed only in a case where the reproduced scene includes a main subject.

8. The information processing apparatus according to claim 6, wherein the circuitry causes a representative image for each reproduced scene to be displayed as the AR content.

9. The information processing apparatus according to claim 6, wherein the circuitry causes the AR content to be displayed in a peripheral portion of a field of view of the user in a case where the reproduced scene is not a main scene in the original content, and causes the AR content to be displayed in a central portion of the field of view of the user in a case where the reproduced scene is a main scene in the original content.

10. The information processing apparatus according to claim 1, wherein the circuitry controls the manner of displaying the AR content on a basis of a result of recognition of an object existing in the real space.

11. The information processing apparatus according to claim 10, wherein in a case where a rectangular region existing in the real space is detected, the circuitry causes the AR content to be displayed at a position corresponding to the rectangular region.

12. The information processing apparatus according to claim 10, wherein in a case where an advertisement medium existing in the real space is recognized, the circuitry causes the AR content to be displayed at a position corresponding to the advertisement medium.

13. The information processing apparatus according to claim 1, wherein the circuitry controls the manner of displaying the AR content on a basis of a gesture of the user.

14. The information processing apparatus according to claim 1, wherein the circuitry generates VR content based on the AR content and image information obtained by photographing the real space.

15. The information processing apparatus according to claim 1, wherein the circuitry further performs wireless communication with a head mounted display,
   the circuitry receives image information of the real space photographed by a camera included in the head mounted display and sensor information acquired by a sensor included in the head mounted display, and
   the circuitry causes the display device included in the head mounted display to display the AR content on a basis of the image information and the sensor information.

16. An information processing method comprising controlling, by a processor, display of Augmented Reality (AR) content by a display device arranged in front of eyes of a user,
   wherein the controlling further includes
      controlling a manner of displaying the AR content so that a degree of decrease in user's viewing level of a real space is reduced as compared with a case where original content is displayed, the manner of displaying including at least one of display content, a display position, and a display timing,
      controlling a display position of the AR content on a basis of an action status of the user, and
      causing the AR content to be displayed in a peripheral portion of a field of view of the user in a case where the user is moving, and causes the AR content to be displayed in a central portion of the field of view of the user in a case where the user is stationary.

17. A non-transitory computer-readable medium encoded with computer-readable instructions that, when executed by a computer, cause the computer to perform a method comprising controlling display of Augmented Reality (AR) content by a display device arranged in front of eyes of a user,
   wherein the controlling further includes
      controlling a manner of displaying the AR content so that a degree of decrease in user's viewing level of a real space is reduced as compared with a case where original content is displayed, the manner of displaying including at least one of display content, a display position, and a display timing,
      controlling a display position of the AR content on a basis of an action status of the user, and
      causing the AR content to be displayed in a peripheral portion of a field of view of the user in a case where the user is moving, and causes the AR content to be displayed in a central portion of the field of view of the user in a case where the user is stationary.

* * * * *